(12) United States Patent
Zeng et al.

(10) Patent No.: US 11,646,672 B2
(45) Date of Patent: May 9, 2023

(54) POWER CONVERTING DEVICE

(71) Applicant: DELTA ELECTRONICS, INC., Taoyuan (TW)

(72) Inventors: Jian-Hong Zeng, Taoyuan (TW); Xiao-Ni Xin, Taoyuan (TW); Rui Wu, Taoyuan (TW); Min Zhou, Taoyuan (TW); Hao-Yi Ye, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 83 days.

(21) Appl. No.: 17/226,105

(22) Filed: Apr. 9, 2021

(65) Prior Publication Data

US 2021/0226552 A1 Jul. 22, 2021

Related U.S. Application Data

(62) Division of application No. 15/285,473, filed on Oct. 4, 2016, now Pat. No. 11,018,596.

(30) Foreign Application Priority Data

Oct. 9, 2015 (CN) .......................... 201510648279.9

(51) Int. Cl.
*H01F 17/04* (2006.01)
*H02M 7/00* (2006.01)
*H02M 3/00* (2006.01)
*H01F 38/14* (2006.01)
*H02M 3/158* (2006.01)
*H02M 5/293* (2006.01)
(Continued)

(52) U.S. Cl.
CPC ............ *H02M 7/003* (2013.01); *H01F 17/04* (2013.01); *H01F 38/14* (2013.01); *H02M 3/003* (2021.05); *H02M 3/158* (2013.01); *H02M 5/293* (2013.01); *H02M 7/537* (2013.01); *H01F 2017/065* (2013.01)

(58) Field of Classification Search
None
See application file for complete search history.

(56) References Cited

U.S. PATENT DOCUMENTS 5,315,982 A * 5/1994 Ward .................. F02P 3/02
123/634
6,142,130 A * 11/2000 Ward .................. F02P 3/005
361/263

(Continued)

*Primary Examiner* — Courtney L Smith
(74) *Attorney, Agent, or Firm* — CKC & Partners Co., LLC

(57) ABSTRACT

A power converter device includes a first current level, a second current level, a first magnetic layer and a second magnetic layer. The first current level and the second current level are used to load a current loop which has AC current component. The current loop includes a power element module and a conductor coupled to the power element module. The power element module includes at least two electrodes. Voltage among the at least two electrodes is AC voltage. AC current magnitudes of the at least two electrodes are substantially equal and in the opposite direction. The first magnetic layer and the second magnetic layer are used to load a magnetic loop which includes AC magnetic flux component. The first magnetic layer and the second magnetic layer are disposed along two opposite sides of the first current level.

9 Claims, 38 Drawing Sheets

(51) Int. Cl.
*H02M 7/537* (2006.01)
*H01F 17/06* (2006.01)

(56) References Cited

U.S. PATENT DOCUMENTS

| | | | | |
|---|---|---|---|---|
| 7,178,513 B2* | 2/2007 | Ward | ............... | F02P 3/045 |
| | | | | 123/634 |
| 7,182,077 B2* | 2/2007 | Ward | ............... | F02P 3/0435 |
| | | | | 361/263 |
| 10,062,499 B2* | 8/2018 | Ji | ............... | H05K 1/181 |
| 2014/0369006 A1* | 12/2014 | Williams | ............ | H05K 7/2089 |
| | | | | 29/832 |
| 2019/0027305 A1* | 1/2019 | Handy | ............... | H01F 27/255 |

* cited by examiner

POWER CONVERTING DEVICE

RELATED APPLICATIONS

The present application is a Divisional Application of the U.S. application Ser. No. 15/285,473, filed Oct. 4, 2016, which claims priority to Chinese Application Serial Number 201510648279.9, filed Oct. 9, 2015, all of which are herein incorporated by reference.

BACKGROUND

Field of Invention

The present invention relates to a power transformation technology. More particularly, the present invention relates to a power converting device.

Description of Related Art

With increasing requirements for intelligent life, social requirements for data processing are increasingly strong. Energy consumption for global data processing reaches several hundred billions of degrees or even several trillions of degrees per year on average. An occupied area of a large data center can reach several of ten thousands of square meters. Therefore, high efficiency and high power density are key indicators of steady development of the power electronic industry.

The key unit of the data center is server, and its motherboard usually consists of the data processing chips such as CPU, chipsets, and memory, its power source, and necessary peripheral components. As the handling ability of per unit volume of the sever increases, it means the amount and the integration of these processing chips also need to be increased, which causes space occupied and energy consumption increasing. Therefore, the power (also called motherboard power since it is on the same motherboard with the data processing chips) which supplied power for these chips needs higher efficiency, higher power density, and smaller volume to let the whole sever and even the entire data center save power and efficiently reduce the occupied area.

Since the power supply for digital chips usually requires low voltage and high current. Therefore, in order to reduce the losses of the output leads and the effect on the impedance, the positions of the powers which directly supply power to the chips on the motherboard are needed to close to the digital chips as possible. Therefore, these powers which directly supply power to the chips are called Point of the Load (POL). The inputs of the aforementioned POL are provided from other powers. Typical input voltage for POL is about 12V. Since 12V is a lower voltage value, the buck converter is usually used to realize POL directly. It outputs various kinds of voltage values between 0V-5V to corresponding digital chips.

In order to improve the power performance, the industry is committed to optimize the semiconductor portions and the inductors. However, after many years of efforts, the optimization of the semiconductor portions and the inductors is almost reached the extreme. It is hard to use the way which optimizes the semiconductor portions and the inductors to improve the power performance.

It can be seen that, the existing ways which mention above cannot effectively improve the power performance. In order to solve the above problems, related fields made a great effort to seek the solutions, but it did not develop the appropriate solutions for so long.

SUMMARY

The summary proposes to provide a simplified abstract of the present disclosure to let readers having basic understanding for the present disclosure. This summary is not a complete overview of the present disclosure, and it does not propose to indicate important/critical components of the present embodiment or define the scope of the present invention.

One technical aspect of present invention relates to a power converting device which includes a first current level, a second current level, a first magnetic layer, and a second magnetic layer. The first current level and the second current level are used to load a current loop which has AC current component, the current loop comprises a power element module and a conductor, and the conductor is coupled to the power element module. The power element module includes at least two electrodes, voltage among the at least two electrodes is AC voltage, and AC current magnitudes of the at least two electrodes are substantially equal and in the opposite direction. The first magnetic layer and the second magnetic layer are used to load a magnetic loop which has AC magnetic flux component. The first magnetic layer and the second magnetic layer are disposed along two opposite sides of the first current level respectively. The first current level and the second current level are disposed along two opposite sides of the second magnetic layer respectively.

In an embodiment, the first current level, the second current level, the first magnetic layer, and the second magnetic layer are staggered with each other.

In another embodiment, the power element module includes at least one switch disposed in the first current level.

In another embodiment, the power element module includes a carrier board. The at least one switch is disposed on the carrier board.

In another embodiment, the power converting device further includes a first magnetic-conductive portion and a second magnetic-conductive portion. The first magnetic-conductive portion is disposed in the first magnetic layer. The second magnetic-conductive portion is disposed in the second magnetic layer. The conductor is disposed on an outer surface of the second magnetic-conductive portion, and coupled to the carrier board.

In still another embodiment, the power element module further includes a carrier board and a power semiconductor unit. The carrier board includes an upper surface and a lower surface. The power semiconductor unit is disposed on the upper surface or the lower surface of the carrier board.

In still another embodiment, the first magnetic layer includes a first magnetic cell. The first magnetic cell is disposed on the upper surface of the carrier board. The second magnetic layer includes a second magnetic cell. The second magnetic cell is disposed on the lower surface of the carrier board. There is a chamber between the first magnetic cell and the second magnetic cell. The power element module is disposed in the chamber, and the conductor is disposed on the outer surface of the first magnetic cell or the outer surface of the second magnetic cell.

In an embodiment, the chamber has a depth. The power element module is disposed to enter into the chamber with at least ⅓ of the depth of the chamber.

In another embodiment, the power element module includes a first power element module and a second power element module. The first power element module and the second power element module are connected in series to simultaneously perform the power conversion for an input to generate an output. At least one of the first power element module and the second power element module is disposed in the chamber.

Therefore, according to the summary of the present invention, by providing a power converting device to reduce the loss and further improve the power performance.

After refer to the embodiments below, people skilled in the art can easily understand the basic spirit of present invention, technical means and aspects taken by present invention.

BRIEF DESCRIPTION OF THE DRAWINGS

In order to let above mention of the present invention and other objects, features, advantages, and embodiments be more easily understood, the description of the accompanying drawing as follows.

Figure 1A:
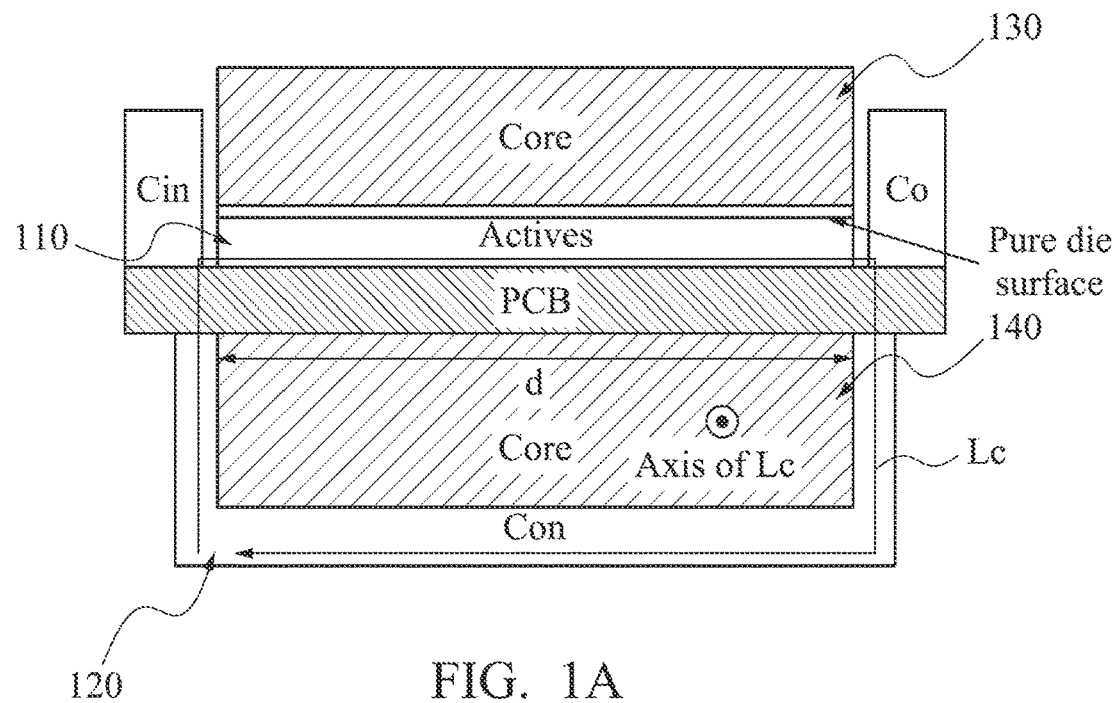
FIG. 1A is a schematic cross-sectional view of a power converting device according to embodiments of the present invention.

According to the usual practice, various features and components of the drawings are not drawn to scale. The drawing way is for the best way to present specific features and components which relate to present invention. In addition, the same or similar element symbols are used to indicate similar elements/parts among the different drawings.

DETAILED DESCRIPTION

Specific embodiments of the present invention are described in detail below in order to make the disclosure more complete and detailed. However, they are not the only form to implement or use the embodiments of the invention. The DETAILED DESCRIPTION contains features of many embodiments, steps to construct and operate the embodiments, and the order of the steps. However, other embodiments may be used to achieve such functions and steps.

The terminology used herein has the same meaning with that people skilled in the art may understand unless it is defined additionally in the specification. Furthermore, singular of nouns in the specification may cover plural of the same nouns; and plural of nouns may cover singular of the same nouns when there is no context conflict.

Moreover, "couple" used in the specification means two or more components are physically or electrically connected to the each other directly or indirectly, or it may also mean interactions or interoperations of the two or more components.

Figure 1B:
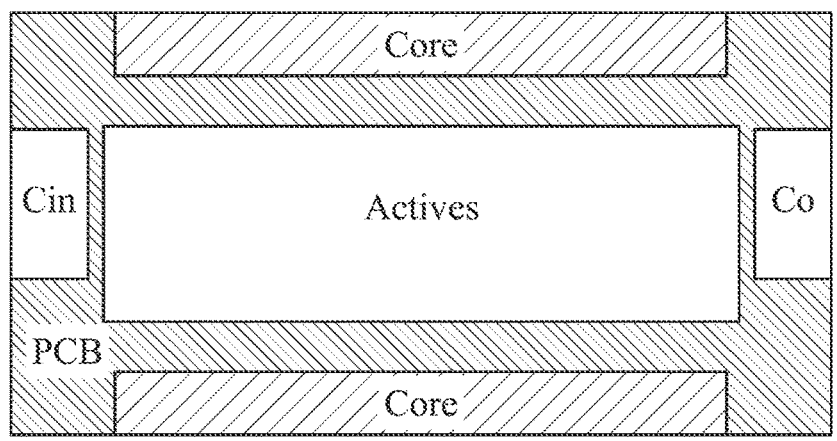
FIG. 1B is a schematic cross-sectional view of the power converting device as shown in FIG. 1A according to embodiments of the present invention.
Figure 1C:
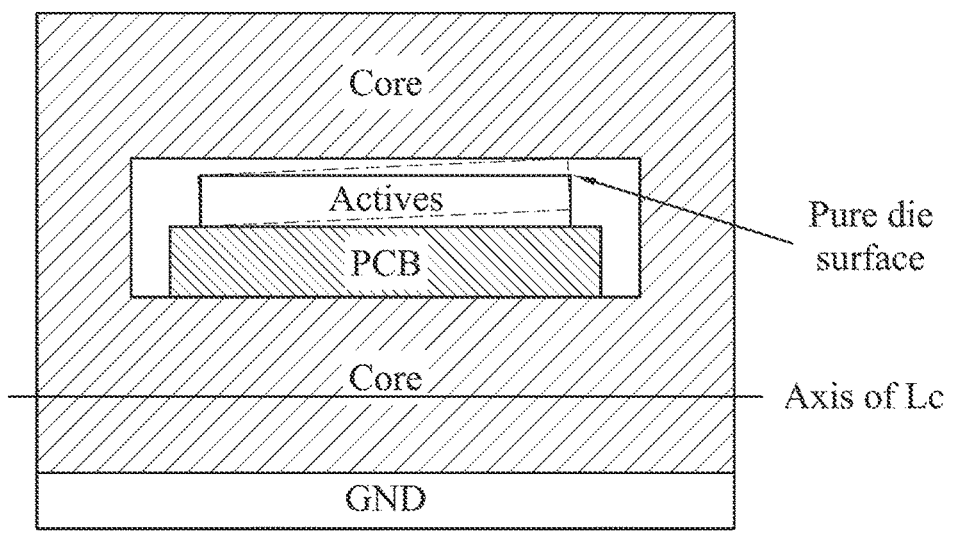
FIG. 1C is a schematic cross-sectional view of the power converting device as shown in FIG. 1A according to embodiments of the present invention.
Figure 1D:
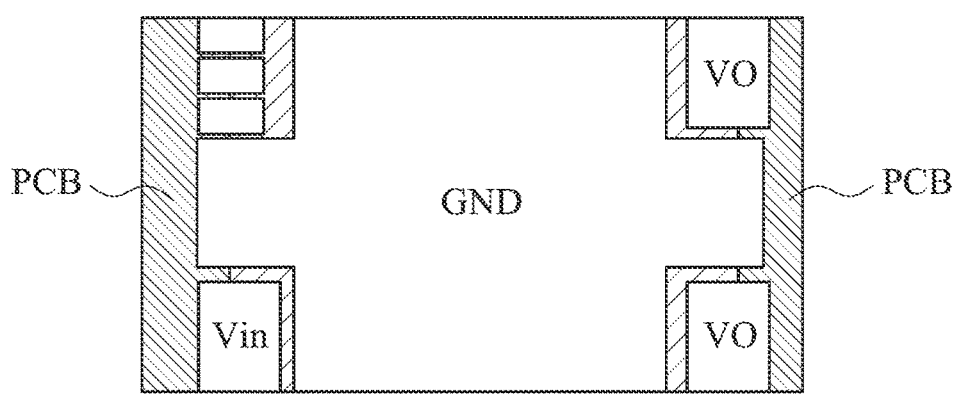
FIG. 1D is a schematic bottom view of the power converting device as shown in FIG. 1A according to embodiments of the present invention.
Figure 1E:
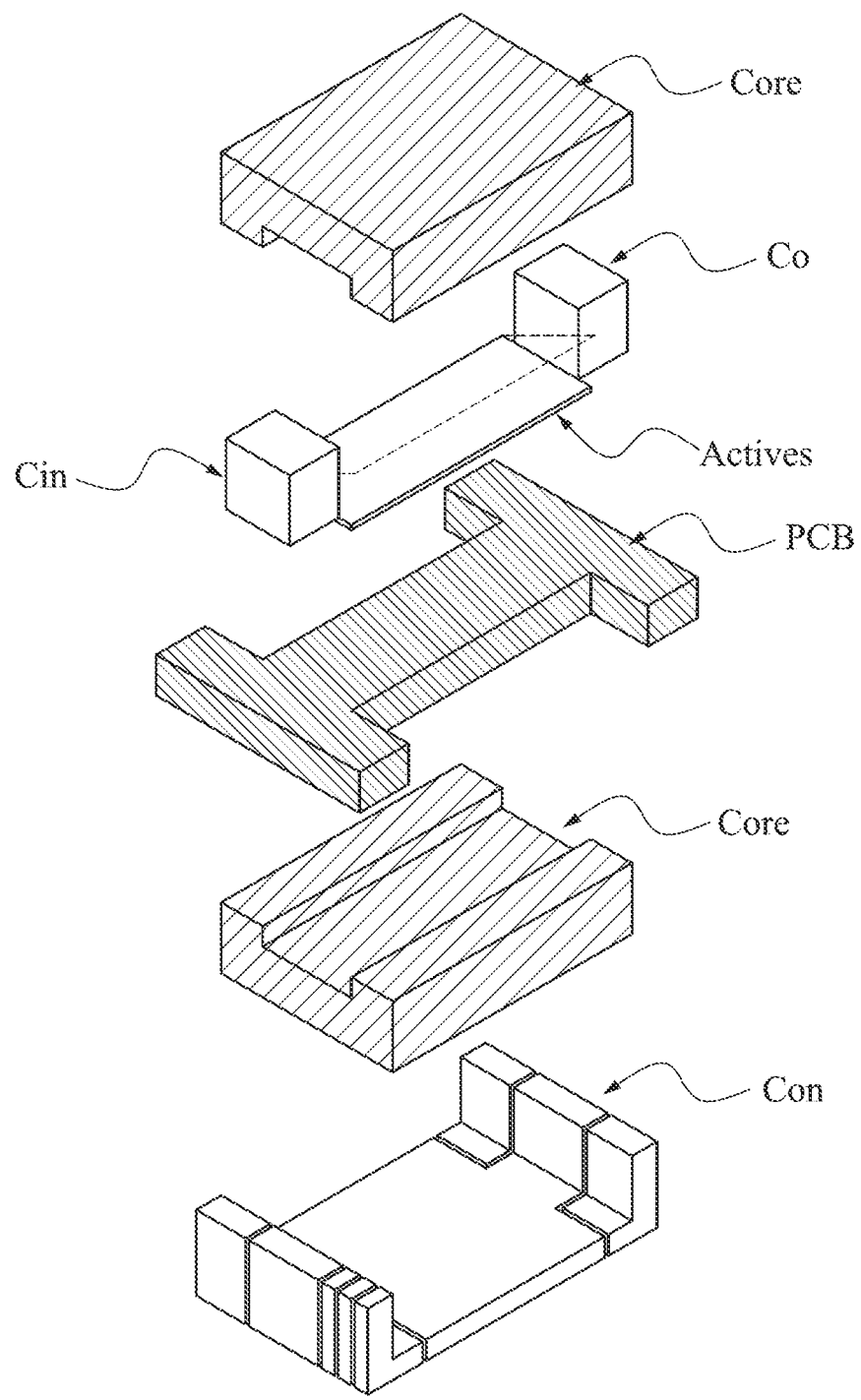
FIG. 1E is an explosion diagram of the power converting device as shown in FIG. 1A according to embodiments of the present invention.
Figure 1F:
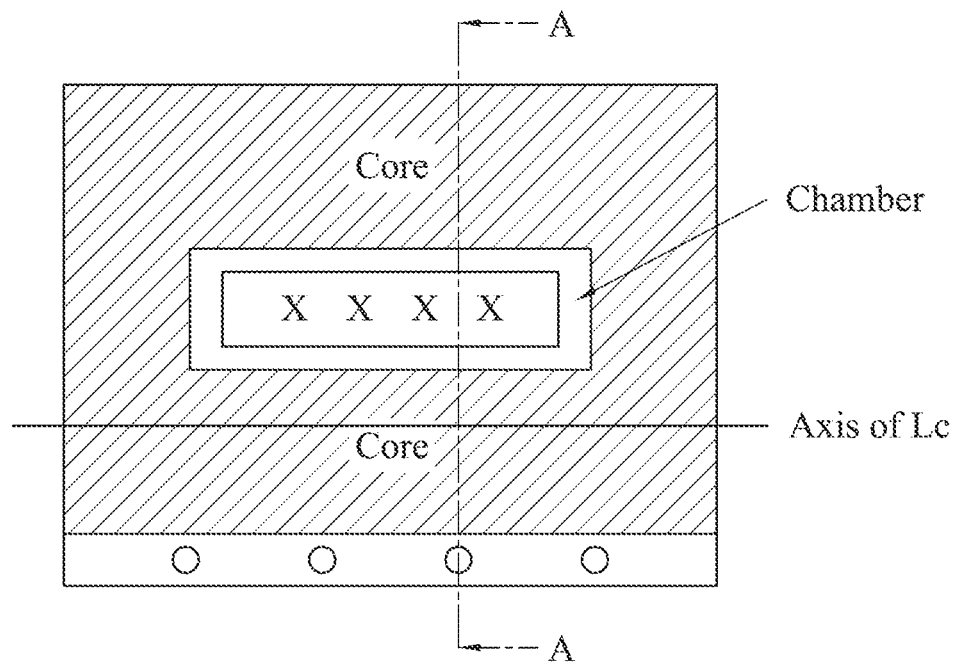
FIG. 1F is a schematic diagram of an iron core and a current loop according to embodiments of the present invention.
Figure 1F:
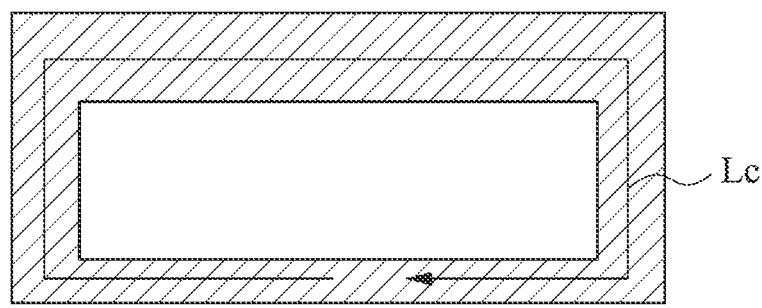

Since the conductor losses relate to the specific distribution of the current, in general, the more uniform distribution of the current and the shorter current path, the lower losses. In order to reduce the losses to further improve power performance, the present invention provides a power converting device, and the description is as follows. FIG. 1A is a longitudinal schematic cross-sectional view of a power converting device according to embodiments of the present invention. FIG. 1B is a transverse schematic cross-sectional view of the power converting device as shown in FIG. 1A according to embodiments of the present invention. FIG. 1C is a transverse schematic cross-sectional view of the power converting device as shown in FIG. 1A according to embodiments of the present invention. FIG. 1D is a schematic bottom view of the power converting device as shown in FIG. 1A according to embodiments of the present invention. FIG. 1E is an explosion diagram of the power converting device as shown in FIG. 1A according to embodiments of the present invention. FIG. 1F is a schematic diagram of an iron core and a current loop as shown in FIG. 1A according to embodiments of the present invention. As shown in FIG. 1A, the power converting device includes a power element module (including at least two electrodes, a power semiconductor unit Actives, an input capacitor Cin, an output capacitor Co, and a carrier board PCB), a magnetic-conductive assembly Core, and a conductor Con. With respect to structure, the components of the power element module are disposed on the carrier board, the power element module is located inside the magnetic-conductive assembly Core, the conductor Con is disposed on the outer surface of the magnetic-conductive assembly Core and coupled to the carrier board PCB.

Figure 1G:
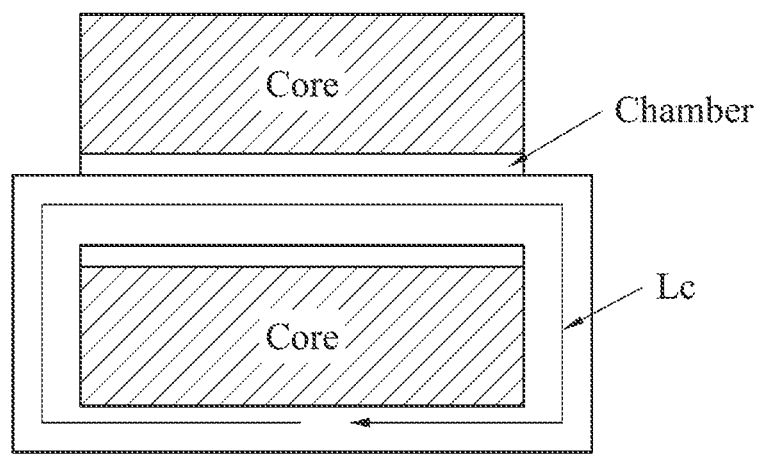
FIG. 1G is a schematic diagram of a chamber and the current loop according to embodiments of the present invention.

Please also refer to FIGS. 1A-1F, a current loop Lc in the power converting device forms between the power element module and the conductor Con. As shown in FIG. 1F, the current loop is a barrel-shaped ring, and may realize the uniform and short distribution of the current. In comparison with another type of the current loop, the barrel-shaped ring has an advantage for efficiency due to the uniform distribution of the current and the short average path, and the advantage for the dimension is also very significant. The current loop Lc has three main parameters of the dimension: the inside diameter, the outside diameter, and the length. In order to let the meaning of the barrel-shaped ring more clearly, defining the barrel-shaped ring as: "The average ring wall thickness of the current loop is less than the length of the loop." Further, as shown in FIG. 1A, the axis of the current loop Lc is perpendicular to the paper. However, the current loop Lc of the present invention is not limited to the barrel-shaped ring. The barrel ring is only used to exemplarily illustrate one of the implementation of the present invention. Those skilled in the art may selectively use the appropriate type of the current loop according to the actual demand. Further, the current loop is an inductive current loop. That is, the overall impedance of the current loop reveals an inductive behavior at the circuit operating frequency. FIG. 1G is a schematic diagram of a chamber and the current loop according to embodiments of the present invention. FIG. 1G shows the corresponding structure of the current loop and the chamber.

Voltage among at least two electrodes of the aforementioned power element module is AC voltage. In an embodiment, the aforementioned voltage may be AC voltage and its DC component may be almost neglected (e.g., the ratio is less than 1%). Furthermore, the AC current magnitudes of at least two electrodes are equal and in the opposite direction. The current loop Lc has AC current component. The magnetic loop has AC magnetic flux component. In another embodiment, the current loop Lc of the present invention is not only a conductor comprising copper, or it is easier to understand above barrel shape or pie shape. Actually, in the current loop Lc of the present invention, also having the components such as the capacitors Cin and Co and the power semiconductor unit Actives. Therefore, when realizing the present invention, it should be noticed the position of the power semiconductor unit Actives in the barrel-shaped current loop. In general, the power semiconductor unit Actives has at least one pure die therein. The aforementioned pure die is typically a sheet which has tiny thickness (e.g., less than 100 μm). The pure die includes plural surfaces. The surface which occupies the most area of the pure die is the pure die surface, such as the upper surface portion of the power semiconductor unit Actives as shown in the figure.

In order to realize the shortest and the most uniform current trend, no regardless of what kind of package the power semiconductor unit uses, it all need to try to guarantee that an included angle between the surface of the most area of the power semiconductor unit Actives (e.g., the pure die surface) and an axis of the current loop Lc is less than 45 degrees. As shown in FIGS. 1C and 1E, in ideal situation, the surface of the most area of the power semiconductor unit Actives (the solid line) is horizontal, and therefore the included angle between the surface of the most area of the power semiconductor unit Actives (the solid line) and the axis of the current loop Lc is ideally to be 0 degree. However, as shown in FIGS. 1C and 1E, due to some reason (such as limitation of manufacturing process), the surface of the most area of the power semiconductor unit Actives (the dotted line) may be not horizontal, and therefore the included angle between the surface of the most area of the power semiconductor unit Actives (the dotted line) and the axis of the current loop Lc is less than 45 degrees, instead of 0 degree. It should be noted that the axis of the current loop Lc vertically enters/leaves the FIG. 1A. When using the barrel-shaped current ring, the pure die may mount on the ring wall of the current loop to reduce the contact resistance and realize the lower conductive losses. In a further embodiment, in order to seek the better performance, the current loop should reveal a barrel shape, and it is better that the pure die and the axis of the current loop Lc are parallel. In still another embodiment, more than 70% of AC current of the current loop Lc flows through the conductor Con.

In another embodiment, the aforementioned magnetic-conductive assembly Core may be a hollow iron core. A magnetic loop forms in the magnetic-conductive assembly Core. Furthermore, the magnetic-conductive assembly Core includes a chamber. It can be seen from FIG. 1A that the magnetic-conductive assembly Core is divided into an upper portion and a lower portion. The upper portion is the first magnetic-conductive portion. The lower portion is the second magnetic-conductive portion. The first magnetic-conductive portion and the second magnetic-conductive portion of the magnetic-conductive assembly Core are combined with each other to form the chamber at its center portion. The current loop Lc passes through the chamber and intersects the magnetic loop to form inductor which the current loop Lc needs. As shown in the figure, a part of the power element module (including the power semiconductor unit Actives) is disposed in the chamber. In order to realize the uniform distribution of the current and short current path, the magnetic-conductive assembly Core of the present invention may use an iron core which has a rectangular shape and a rectangular window to make. However, the present invention is not limited thereto. Those skilled in the art may selectively use the iron core having the appropriate shape to make the magnetic-conductive assembly Core.

In a further embodiment, a power element module is disposed to enter into the chamber with at least ⅓ of the depth d of the chamber. However, the present invention is not limited to the above embodiment. Those skilled in the art may dispose the power element module to enter into the chamber with a depth according to the actual demand. The depth d of the chamber means the depth/length of the hollow part between the first magnetic-conductive portion and the second magnetic-conductive portion of the magnetic-conductive assembly Core. In still another embodiment, the conductor Con may be disposed outside the chamber of the magnetic-conductive assembly Core. For example, the conductor Con may be disposed on the outer surface of the magnetic-conductive assembly Core, and coupled to the carrier board PCB.

Please continue to refer to FIG. 1A, in another embodiment, the power converting device consists of a first current level 110, a second current level 120, a first magnetic layer 130, and a second magnetic layer 140. The first current level 110 and the second current level 120 are used to load a current loop which has AC current component. The current loop comprises a power element module and a conductor Con. The conductor Con is coupled to the power element module. The power element module comprises at least two electrodes, at least one switch, and a carrier board PCB. Voltage among at least two electrodes is AC voltage. The AC current magnitudes of at least two electrodes are substantially equal and in the opposite direction. Furthermore, the aforementioned switch may be disposed in the first current level 110, and disposed on the carrier board PCB. The aforementioned first magnetic layer 130 and the aforementioned second magnetic layer 140 are used to load a magnetic loop which has AC magnetic flux component. The first magnetic layer 130 and the second magnetic layer 140 are disposed along two opposite sides of the first current level 110 respectively. The first current level 110 and the second current level 120 are disposed along two opposite sides of the second magnetic layer 140 respectively.

In still another embodiment, the first current level 110, the second current level 120, the first magnetic layer 130, and the second magnetic layer 140 are staggered with each other to form inductance which the current loop needs. In another embodiment, the power converting device further comprises a first magnetic-conductive portion (labeling Core at upper portion) and a second magnetic-conductive portion (labeling Core at lower portion). The first magnetic-conductive portion is disposed in the first magnetic layer 130. The second magnetic-conductive portion is disposed in the second magnetic layer 140. Furthermore, a conductor Con is disposed on the outer surface of the second magnetic-conductive portion, and coupled to the carrier board PCB. However, the present invention is not limited to the embodiment as shown in FIG. 1A. Those skilled in the art may selectively configure or adjust the positions of the first current level 110, the second current level 120, the first magnetic layer 130, and the second magnetic layer 140 according to the actual demand.

In a further embodiment, a power converting device comprises a current loop having AC current component and a magnetic loop having AC magnetic flux component. Further, the current loop is an inductive current loop. That is, the overall impedance of the current loop reveals an inductive behavior at the circuit operating frequency, but the present invention is not limited thereto. The current loop having AC current component comprises a power element module and a conductor Con. The conductor is coupled to the power element module. The power element module comprises at least two electrodes, a carrier board, and a power semiconductor unit Actives. Voltage among at least two electrodes is AC voltage. The AC current magnitudes of at least two electrodes are substantially equal and in the opposite direction. The carrier board includes an upper surface and a lower surface. The power semiconductor unit Actives is disposed on the upper surface or the lower surface of the carrier board PCB. The magnetic loop having AC magnetic flux includes a magnetic element Core. It can be seen from FIG. 1A that the magnetic element Core is divided into an upper portion and a lower portion. The upper portion is a first magnetic cell. The lower portion is a second magnetic cell. The first magnetic cell is disposed on the upper surface of the carrier board PCB. The second magnetic cell is disposed on the lower surface of the carrier board PCB. The first magnetic cell and the second magnetic cell form as a carrier of the closed magnetic loop, and there is a chamber between the first magnetic cell and the second magnetic cell. The power semiconductor unit Actives is disposed in the chamber. The conductor Con is disposed on the outer surface of the first magnetic cell or the outer surface of the second magnetic cell.

Please refer to FIG. 1B, the power semiconductor unit Actives is disposed on the carrier board PCB. The input capacitor Cin and the output capacitor Co are also disposed on the carrier board PCB, and disposed in two opposite sides (e.g., the left side, the right side) of the power semiconductor unit Actives respectively. Since the power element module (including the power semiconductor unit Actives) may be disposed to enter into the chamber of the magnetic-conductive assembly Core. Therefore, in the cross-sectional view as shown in FIG. 1B, the magnetic-conductive assembly Core is located on the upper side and lower side of the power semiconductor unit Actives, it means the magnetic-conductive assembly Core of the power converting device may include the power semiconductor unit Actives therein. It can be more understanding for the aforementioned configuration of the power converting device from FIG. 1C. As shown in FIG. 1C, the power element module (including the power semiconductor unit Actives and the carrier board PCB) may be disposed in the chamber of the magnetic-conductive assembly Core. For example, the power element module may be disposed to enter into the chamber with at least ⅓ of the depth d of the chamber or at least ½ of the depth d of the chamber. However, the present invention is not limited to the aforementioned embodiment, those skilled in the art may dispose the power element module to enter into the chamber with the depth according to the actual demand.

Please refer to FIG. 1D, the conductor Con comprises a first portion, a second portion, and a third portion which are respectively etched to be a ground pin GND, output pin Vo, and input pin Vin. In the case of the high power density and high efficiency, the pins of the power usually occupy a larger volume and cause the losses. The configuration of the power converting device of the present invention may solve the aforementioned problems. Please refer to FIG. 1E, the conductor Con has a larger portion disposed on the surface of the magnetic-conductive assembly Core. If the surface is defined as the surface of the Surface Mount Device (SMD) of the power converting device, then the conductor Con which has the current loop on its surface may be disposed as the pins directly. Therefore, the current loop does not need to add the extra current paths or the volume for the sake of extending the pins, and realize the pin volume losses and the efficiency losses to be almost zero. The conventional circuit usually adds extra pins to elicit current to the user board. In contrast, the present invention only defines part of region of the necessary components of the current loop which the power converting device needs as the pins. For example, the conductor Con of the power converting device is defined as the pins, so that, it is equal to without additional process for making aforementioned pins due to extend the pins.

In another embodiment, the pins of the power converting device are not only the ground pin GND or the output pin Vo, but also the input pin Vin or the signal pin. The aforementioned input pin Vin or the signal pin is not disposed in the said current loop basically. Therefore, the portion of the current loop is hard to directly define as the aforementioned pins generally. However, the present invention only needs to use the way which is the same as the ground pin GND or output pin Vo. Use the magnetic-conductive assembly Core under the carrier board PCB of FIG. 1E as a pin carrier. The disposing way hardly increases the extra volume of the power converting device. It may also use the process which is the same as the ground pin GND or the output pin Vo to realize synchronously during the manufacture, so that it will not increase too much material or the manufacturing cost. In another embodiment, the pins are divided into two categories: the one is the pins which are connected in series with the said current loop, that is, part of region of the conductor Con in the specific current loop is as the pins. Due to connect in series with the said current loop, the current of this category of the pins is equal to the current of the current loop. The second one is the pins which are not connected in series with the said current loop, which includes the input pin Vin which is electrically connected to the said current loop, and includes the signal pin which is not directly electrically connected to the said current loop.

Figure 2:
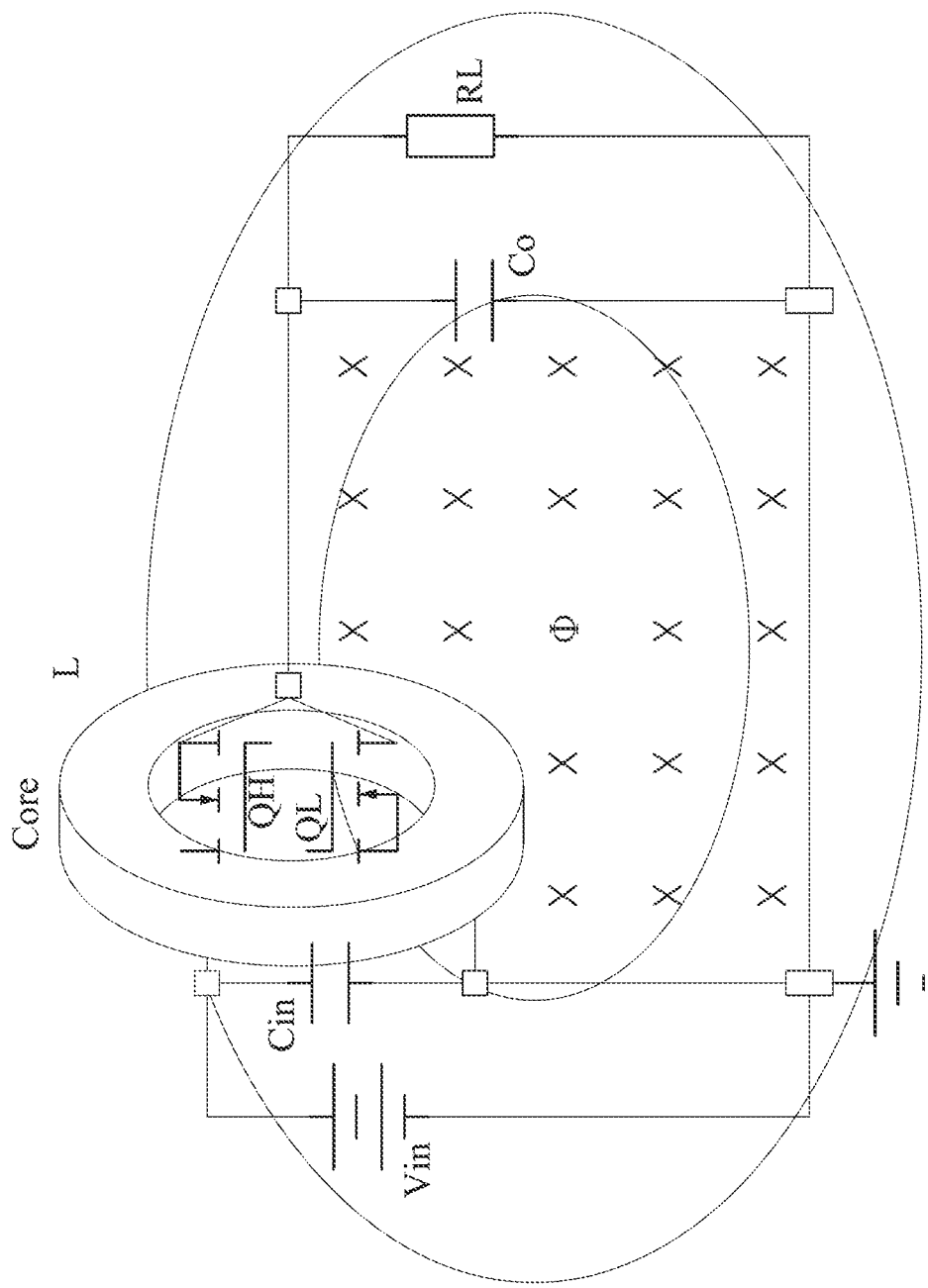
FIG. 2 is a configuration diagram of a magnetic-conductive assembly in power converting device according to embodiments of the present invention.
Figure 3:
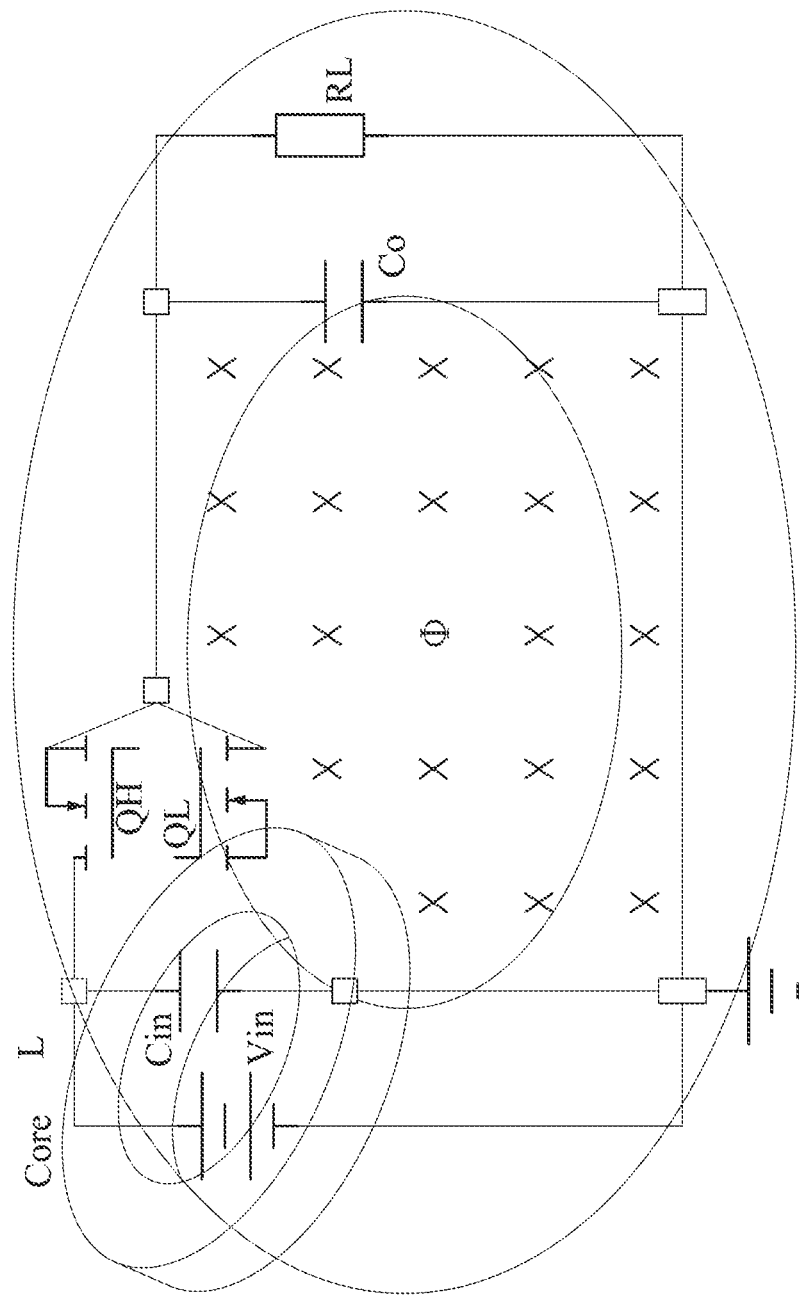
FIG. 3 is a configuration diagram of a magnetic-conductive assembly in power converting device according to embodiments of the present invention.
Figure 4:
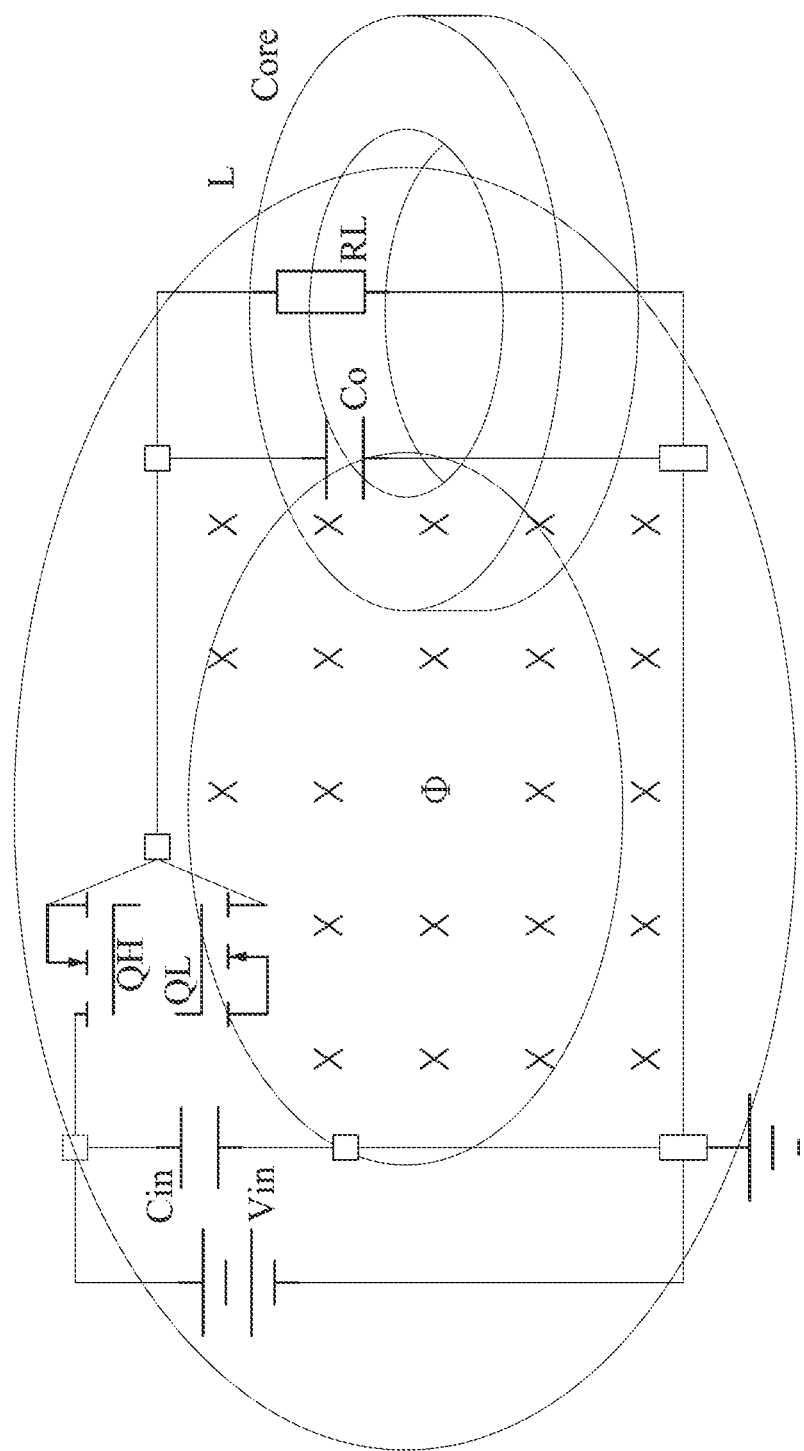
FIG. 4 is a configuration diagram of a magnetic-conductive assembly in power converting device according to embodiments of the present invention.

FIG. 2 is a configuration diagram of a magnetic-conductive assembly in power converting device according to embodiments of the present invention. FIG. 3 is a configuration diagram of a magnetic-conductive assembly in power converting device according to embodiments of the present invention. FIG. 4 is a configuration diagram of a magnetic-conductive assembly in power converting device according to embodiments of the present invention. It should be noted that the technical mean of the present invention to further optimize the space is mainly based on the integrating opportunity between the power element module and the magnetic elements (e.g., the inductor). In the power converting device, inductance of the inductor is realized by the flux linkage of the closed loop, that is, the magnetic characteristic of the soft magnetic element may be reflected, and is realized based on the presence of the flux linkage generating from the current of the closed loop. As shown in formula 1 and 2, the magnetic field intensity is the closed loop integrating over the current (that is, the sum of the current of the closed loop), and the density of the flux linkage is the induction of the magnetic field intensity from the magnetic material. The spatial magnetic field intensity is equal to:

$$H = \oint I\,dl \tag{1}$$

Furthermore, the spatial density of the flux linkage is equal to:

$$B = \mu H \tag{2}$$

The conventional inductor usually consists of the iron core and the coils. It can be understood through the above analysis that the conventional inductor is accessed into the loop, which helps the closed loop to add a high μ value material (that is, $\mu > \mu_o$) with a cross-sectional area (such as AE), thereby realizing the larger magnetic inducted intensity, that is, the larger inductance. Therefore, the actual function of the conventional inductor in the power converting device is realizing that adding a magnetic-conductive assembly Core (e.g., the iron core) in the said closed loop. That being the case, the magnetic-conductive assembly Core may be placed anywhere in the closed loop and does not need to exist in the form of the independent inductor.

To describe the configuration relationship of the magnetic-conductive assembly Core in the power converting device, please refer to FIGS. 2-4, firstly introducing the components in the power converting device. A power element module comprises a first power element module and a second power element module. The first power element module and the second power element module are connected in series. In the first embodiment, the first power element module comprises at least one switch QH and QL in the power semiconductor unit Actives and an input capacitor Cin. The second power element module comprises an output capacitor Co and a load RL. Therefore, the first power element module and the second power element module may be simultaneously performed the power conversion for an input Vin to generate an output.

As shown in FIG. 2, at least one switch QH and QL of the first power element module is disposed in a chamber of the magnetic-conductive assembly Core, so that, the magnetic-conductive assembly Core in the current loop is equivalent to the inductor. As shown in FIG. 3, the input capacitor Cin of the first power element module is disposed in the chamber of the magnetic-conductive assembly Core, so that, the magnetic-conductive assembly Core in the current loop is also equivalent to the inductor. As shown in FIG. 4, the second power element module is disposed in the chamber of the magnetic-conductive assembly Core, so that, the magnetic-conductive assembly Core in the current loop is also equivalent to the inductor. Therefore, those skilled in the art may dispose the first power element module and/or the second power element module in the chamber of the magnetic-conductive assembly Core according to the actual demand. In summary, in the current loop (e.g., the buck circuit, the Boost circuit, and the resonance circuit) which need the inductors, the magnetic-conductive assembly Core may be placed anywhere in the current loop, as long as guaranteeing the current loop passing through the window of the magnetic-conductive assembly Core. And the current loop includes the AE area of the magnetic-conductive assembly Core, so that, the inductive winding which originally independently exist is not required, thereby reducing the losses and the volume. Furthermore, due to the closely combination of the magnetic-conductive assembly Core and the other components of the circuit, so that the volume may be further reduced.

In another embodiment, the chamber of magnetic-conductive assembly Core has a depth. The first power element module and/or the second power element module are disposed to enter into the chamber with at least ⅓ of the depth of the chamber, or the first power element module and/or the second power element module are disposed to enter into the chamber with at least ½ of the depth of the chamber. However, the present invention is not limit to the aforementioned embodiment, those skilled in the art may dispose the first power element module and/or the second power element module to enter into the chamber with a depth according to the actual demand.

Figure 5A:
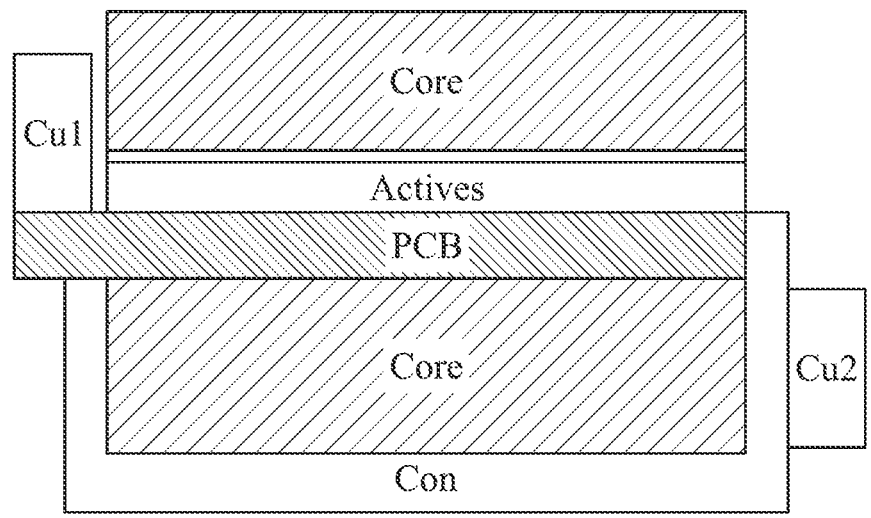
FIG. 5A is a schematic cross-sectional view of a power converting device according to embodiments of the present invention.
Figure 5B:
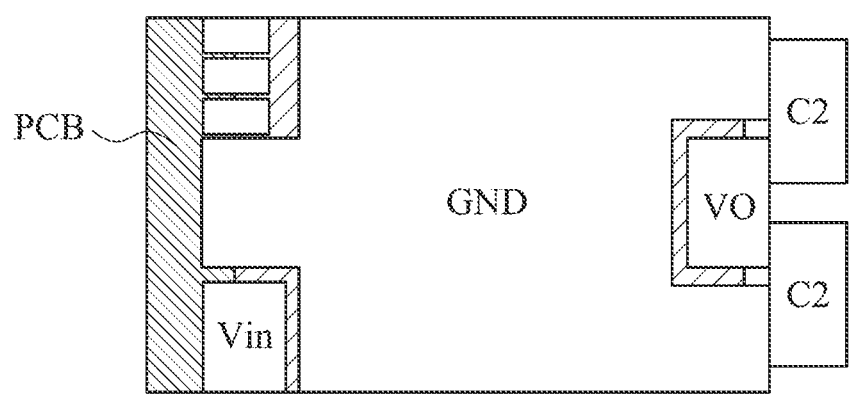
FIG. 5B is a schematic bottom view of the power converting device as shown in FIG. 5A according to embodiments of the present invention.
Figure 5C:
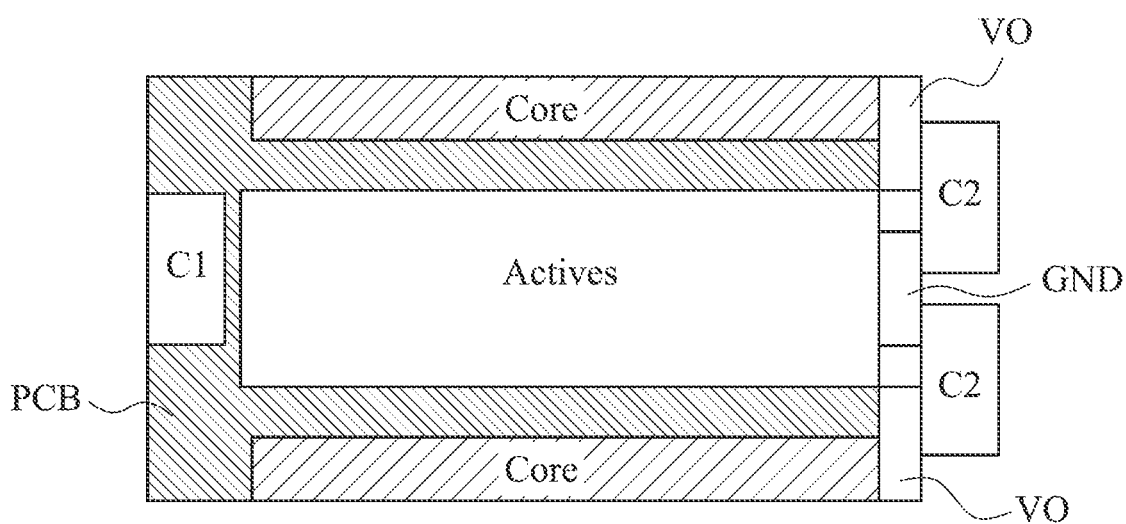
FIG. 5C is a schematic cross-sectional view of the power converting device as shown in FIG. 5A according to embodiments of the present invention.

FIG. 5A is a schematic cross-sectional view of a power converting device according to embodiments of the present invention. FIG. 5B is a schematic bottom view of the power converting device as shown in FIG. 5A according to embodiments of the present invention. FIG. 5C is a schematic cross-sectional view of the power converting device as shown in FIG. 5A according to embodiments of the present invention. In comparison with the power converting device as shown in FIG. 1A, the power converting device of FIGS. 5A-5C includes a capacitor unit Cu1 and a capacitor unit Cu2. The capacitor unit Cu2 includes plural capacitors C2. Please refer to FIG. 5A, the capacitor unit Cu1 is disposed on the carrier board PCB, and the capacitor unit Cu2 is disposed on the conductor Con of the power converting device.

The conductor Con comprises a first portion and a second portion, the area of the first portion is larger than the area of the second portion. The first portion is disposed as a first pin of the power converting device correspondingly, and the second portion is disposed as a second pin of the power converting device correspondingly. As shown in FIG. 5B, the first pin is the ground pin GND, the second pin includes the output pin Vo and the input pin Vin. As shown in the figure, the area of the ground pin GND is larger than the area of the output pin Vo. In comparison with the power converting device as shown in FIG. 1A, the capacitors C2 may be moved out from the power element module, and disposed on the conductor Con. And according to the arrangement of the pins, And according to the demand, plural capacitors C2 may be disposed in consideration of the demand. Thus, the power element module may be simplified, and the capacitors C2 also have the filtering effect to the parasitic inductor of the pin, thereby the client receiving the more stable voltage. If using in the buck circuit, the capacitors C2 are connected across the ground pin GND and the output pin Vo, so that the output of the output pin Vo is more stable. As shown in FIG. 5C, the power converting device may comprise plural output pins Vo, each of the capacitors in the capacitor unit Cu2 is connected across the ground pin GND and the output pin Vo.

Figure 6A:
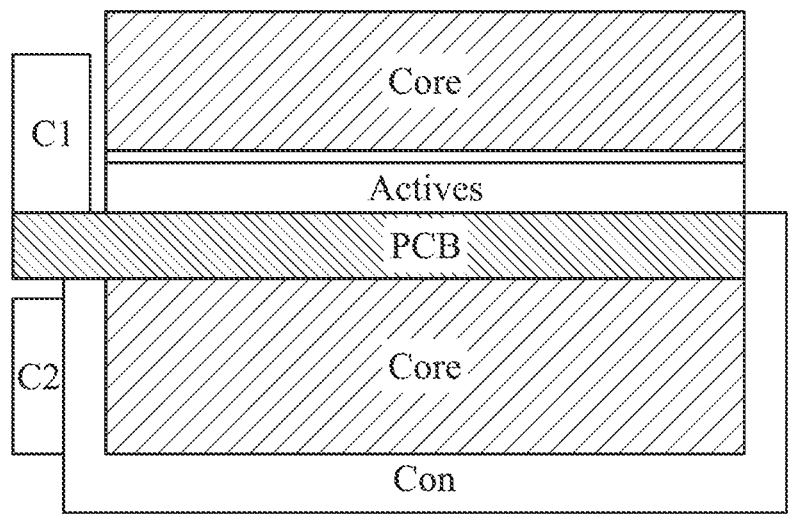
FIG. 6A is a schematic cross-sectional view of a power converting device according to embodiments of the present invention.
Figure 6B:
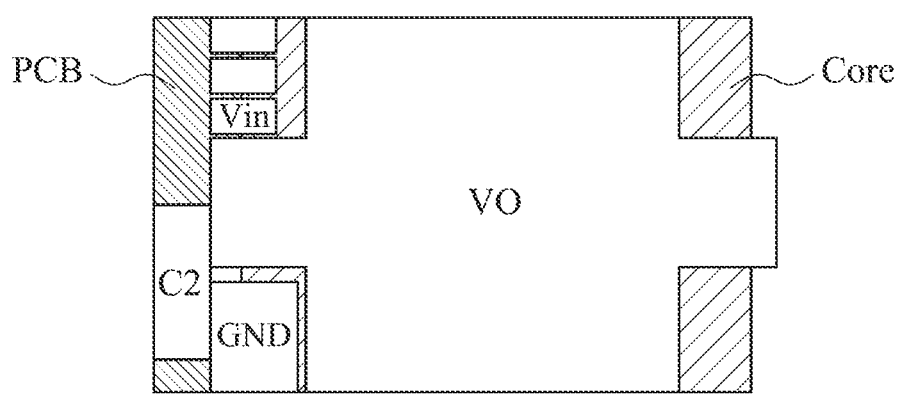
FIG. 6B is a schematic bottom view of the power converting device as shown in FIG. 6A according to embodiments of the present invention.
Figure 6C:
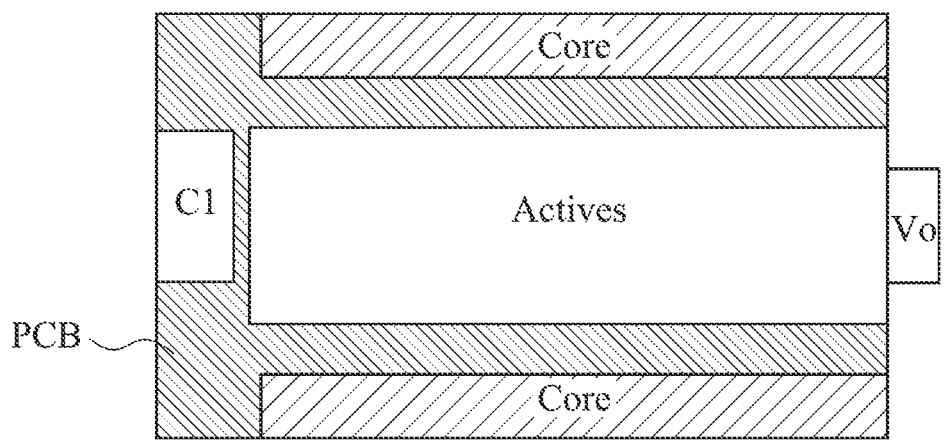
FIG. 6C is a schematic cross-sectional view of the power converting device as shown in FIG. 6A according to embodiments of the present invention.

FIG. 6A is a schematic cross-sectional view of a power converting device according to embodiments of the present invention. FIG. 6B is a schematic bottom view of the power converting device as shown in FIG. 6A according to embodiments of the present invention. FIG. 6C is a schematic cross-sectional view of the power converting device as shown in FIG. 6A according to embodiments of the present invention. Please refer to FIG. 6A, the first portion of the conductor Con may be disposed as the output pin Vo of the power converting device, the second portion may be disposed as the ground pin GND and the input pin Vin of the power converting device. That is to say, the first portion which has larger area in the conductor Con is disposed as the output pin Vo of the power converting device, for example, using in the buck circuit. The capacitor C2 is connected across the output pin Vo and the ground pin GND of the power converting device, and the capacitor C1 is disposed on the carrier board PCB. In comparison with the power converting device as shown in FIG. 5A, the capacitor C1 and the capacitor C2 of the power converting device of the FIG. 6A are both disposed in the same side of the power semiconductor unit Actives. The advantage of such configuration is that, a configuration way may uniformly handle the capacitors. If using in the buck converter, then the electrical conductor Con of the said current loop changes from the ground pin GND of the FIG. 5B to the output pin Vo of the FIG. 6B. Therefore, the length of the ground pin GND may be reduced, so that the noise of the ground pin GND of the client is reduced. As shown in FIG. 6B, in an embodiment, the area of the output pin Vo is larger than the area of the ground pin GND. Furthermore, the input pin Vin, the ground pin GND, and the signal pin may be disposed on the magnetic-conductive assembly Core. Further, the capacitors C2 may be connected across the ground pin GND and the output pin Vo. In another embodiment, the capacitors C2 may be also connected across the input pin Vin and the output pin Vo, depending on the demand.

FIG. 6C is a schematic cross-sectional view of the power converting device according to embodiments of the present invention. As shown in the figure, the power semiconductor unit Actives is disposed on the carrier board PCB. The capacitor C1 is also disposed on the carrier board PCB and located in one side (e.g., the left side) of the power semiconductor unit Actives. One end of the output pin is protruded, this protruding end is located in the other side (e.g., the right side) of the power semiconductor unit Actives.

Figure 7A:
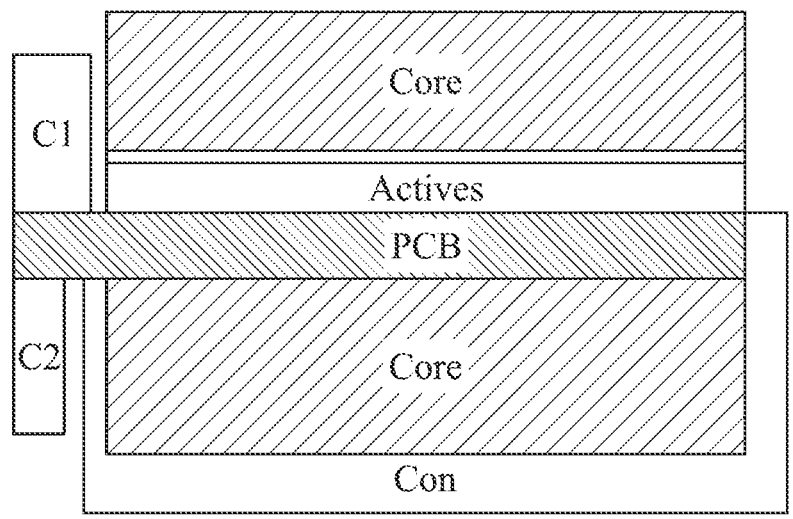
FIG. 7A is a schematic cross-sectional view of a power converting device according to embodiments of the present invention.

FIG. 7A is a schematic cross-sectional view of a power converting device according to embodiments of the present invention. Please also refer the FIG. 6A and FIG. 7A, in the above figures, the capacitor C1 and the capacitor C2 are both disposed in the same side (e.g., the left side) of the power semiconductor unit Actives, and the capacitor C1 is disposed on the carrier board PCB. The difference between FIG. 6A and FIG. 7A is that, the power converting device as shown in FIG. 7A disposes the capacitor C2 on the carrier board PCB. In an embodiment, specifically, the capacitor C1 is disposed on the upper surface of the carrier board PCB, and the capacitor C2 is disposed on the lower surface of the carrier board PCB.

Figure 7B:
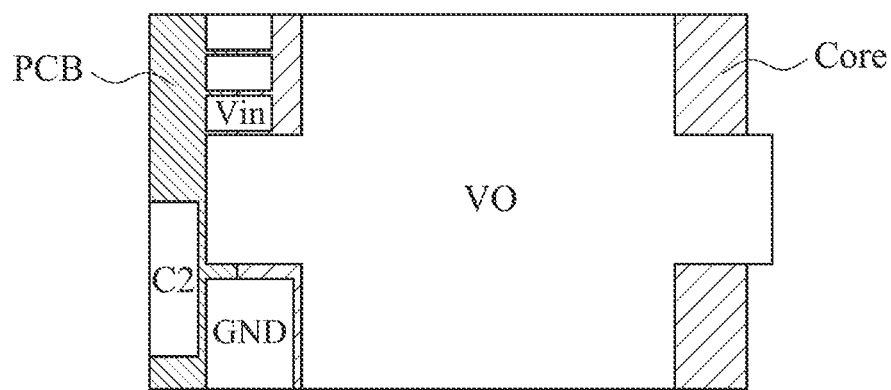
FIG. 7B is a schematic bottom view of the power converting device as shown in FIG. 7A according to embodiments of the present invention.
Figure 7C:
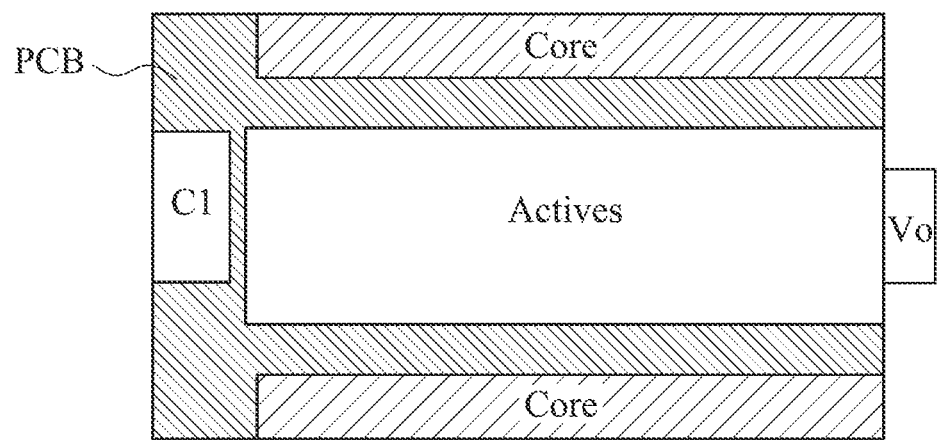
FIG. 7C is a schematic cross-sectional view of the power converting device as shown in FIG. 7A according to embodiments of the present invention.

FIG. 7B is a schematic bottom view of the power converting device as shown in FIG. 7A according to another embodiment of the present invention. As shown in the figure, the first portion of the conductor Con is disposed as the output pin Vo of the power converting device in here. Furthermore, the second portion of the conductor Con is etched as the input pin Vin and the ground pin GND in here. FIG. 7C is a schematic cross-sectional view of the power converting device as shown in FIG. 7A according to a further embodiment of the present invention. As shown in the figure, the power semiconductor unit Actives is disposed on the carrier board PCB. The capacitor C1 is also disposed on the carrier board PCB and located in one side (e.g., the left side) of the power semiconductor unit Actives. One end of the output pin Vo is protruded, this protruding end is located in the other side (e.g., the right side) of the power semiconductor unit Actives.

Figure 8A:
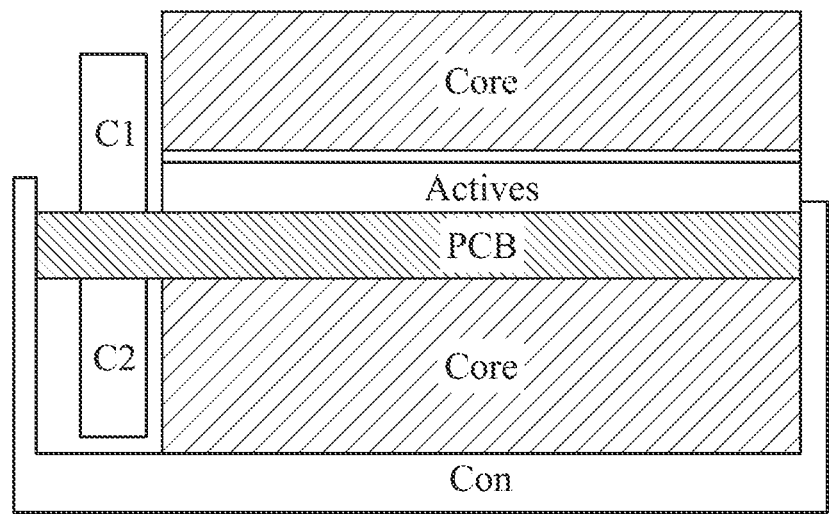
FIG. 8A is a schematic cross-sectional view of a power converting device according to embodiments of the present invention.

FIG. 8A is a schematic cross-sectional view of a power converting device according to an embodiment of the present invention. As shown in the figure, the first portion of the conductor Con of the power converting device is disposed as the output pin Vo of the power converting device in here. In comparison with the power converting device as shown in FIG. 7A, the partial capacitors of the power converting device may be disposed in the inner side of the conductor Con, for example, the partial capacitors C2 are disposed between the conductor Con and the magnetic-conductive assembly Core. The advantage of using above configuration is providing another option for the pin configuration. However, the present invention is not limited to the aforementioned embodiment. In the rest embodiments, the partial capacitor C1 may be also disposed between the conductor Con and the magnetic-conductive assembly Core, depending on the actual demand. Furthermore, the first portion of the conductor Con of the power converting device of FIG. 8A may be the output pin Vo, and the output pin Vo is disposed to couple the side (e.g., the left side) of the carrier board PCB. The advantage of using above configuration is that, the welding resistance and heat resistance of the contact pad of the pin have a better increasing in comparison with the SMD way.

Figure 8B:
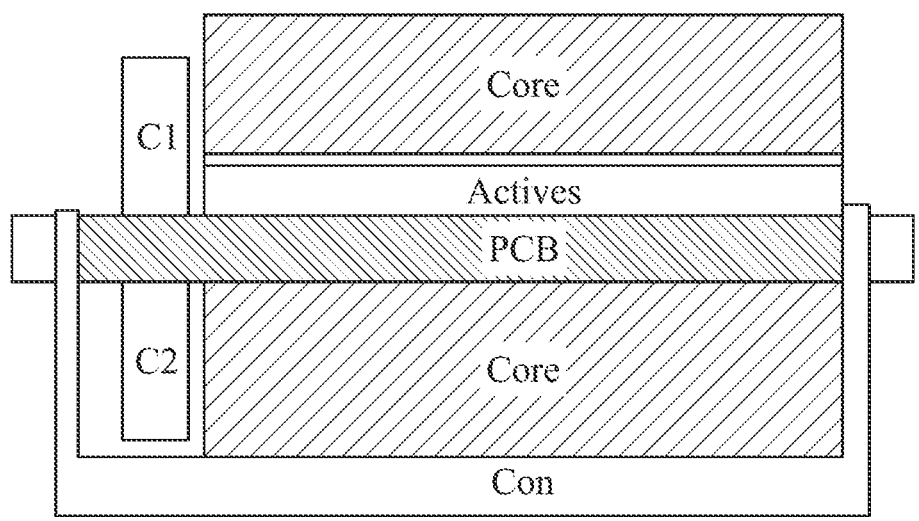
FIG. 8B is a schematic cross-sectional view of a power converting device according to embodiments of the present invention.

FIG. 8B is a schematic cross-sectional view of a power converting device according to embodiments of the present invention. As shown in the figure, the first portion of the conductor Con of the power converting device is disposed as the output pin Vo of the power converting device in here. In comparison with the power converting device as shown in FIG. 8A, the two ends of the carrier board PCB of the power converting device of FIG. 8B are more protruded. In other words, the width of the carrier board PCB of FIG. 8B is larger, and the output pin Vo may be disposed to pass through the carrier board PCB.

Figure 8C:
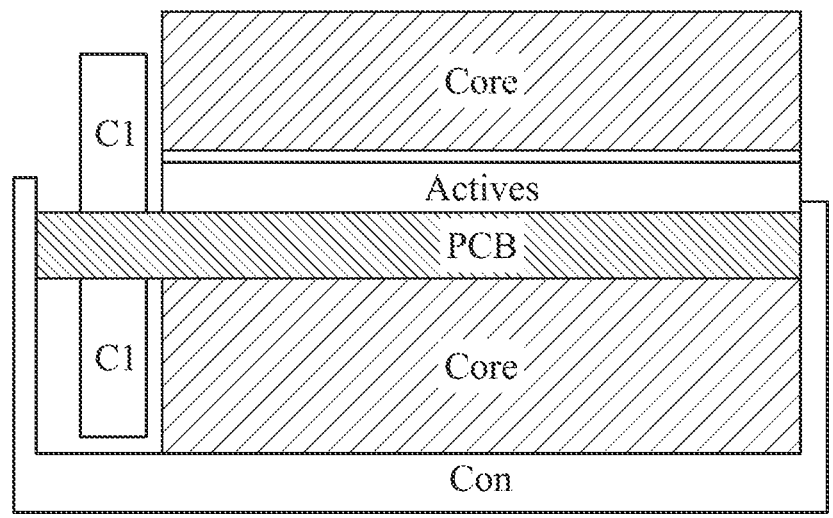
FIG. 8C is a schematic cross-sectional view of a power converting device according to embodiments of the present invention.

FIG. 8C is a schematic cross-sectional view of a power converting device according to embodiments of the present invention. In comparison with the power converting device as shown in FIG. 8A, the power converting device of FIG. 8C may comprise plural capacitors C1, and at least two of these capacitors are disposed between the conductor Con and the magnetic-conductive assembly Core. One of the capacitors C1 is disposed on the upper surface of the carrier board PCB, and the other one of the capacitors C1 is disposed on the lower surface of the carrier board PCB.

Figure 8D:
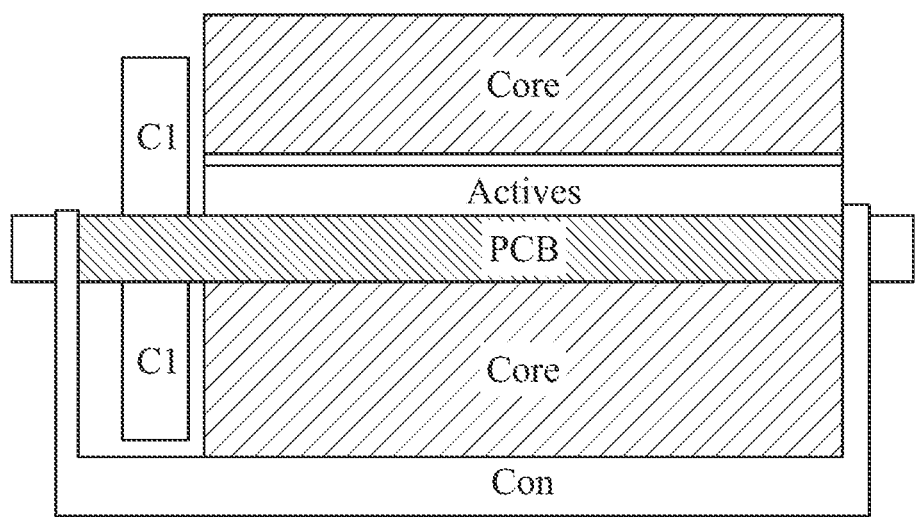
FIG. 8D is a schematic cross-sectional view of a power converting device according to embodiments of the present invention.

FIG. 8D is a schematic cross-sectional view of a power converting device according to embodiments of the present invention. In comparison with the power converting device as shown in FIG. 8B, the power converting device of FIG. 8D may comprise plural capacitors C1, and at least two of these capacitors are disposed between the conductor Con and the magnetic-conductive assembly Core. One of the capacitors C1 is disposed on the upper surface of the carrier board PCB, and the other one of the capacitor C1 is disposed on the lower surface of the carrier board PCB.

Figure 9:
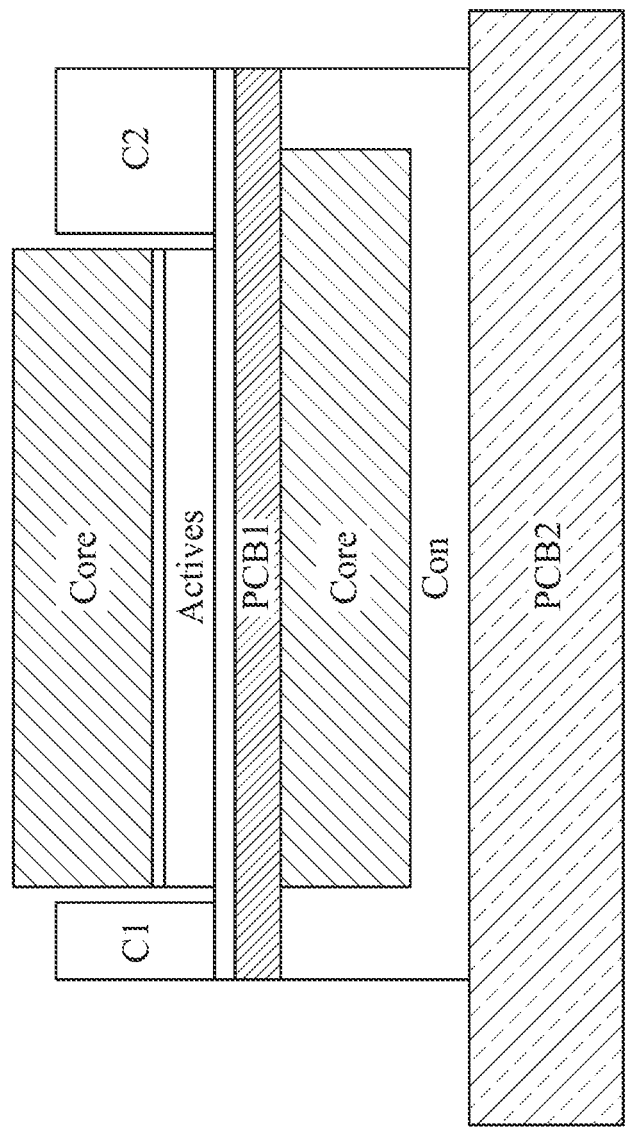
FIG. 9 is an application diagram of a power converting device according to embodiments of the present invention.

FIG. 9 is an application diagram of a power converting device according to embodiments of the present invention. As shown in the figure, in the power converting device in here, the area of the magnetic-conductive assembly Core near the client system board PCB2 is designed to be larger than the area of the magnetic-conductive assembly Core above the power converting device. Under the premise of guaranteeing the same magnetic density (such as the same magnetic cross-section), the magnetic-conductive assembly Core may become thinner. The advantage of using above configuration is that, it is helpful to reduce the height of the whole power converting device. Furthermore, because the lower magnetic-conductive assembly Core is thinner, the length of pin may become shorter, the parasitic inductor become smaller, and it is helpful for reducing the signal noise.

For example, the first magnetic-conductive portion of the magnetic-conductive assembly (e.g., the upper portion of the magnetic-conductive assembly) is disposed above the power semiconductor unit Actives, and the second magnetic-conductive portion of the magnetic-conductive assembly Core (e.g., the lower portion of the magnetic-conductive assembly Core) is disposed under the power semiconductor unit Actives. The contact area of the aforementioned second magnetic-conductive portion and the carrier board is larger than the contact area of the first magnetic-conductive portion and the power semiconductor unit Actives. In an embodiment, the thickness of the second magnetic-conductive portion is less than the thickness of the first magnetic-conductive portion. In another embodiment, the conductor Con is disposed on the outer surface of the second magnetic-conductive portion of the magnetic-conductive assembly Core. Furthermore, the contact area of the second magnetic-conductive portion and the conductor Con is equal to the area of the footprint of the power converting device. In still another embodiment, the conductor Con is disposed in outer side of the second magnetic-conductive portion of the magnetic-conductive assembly Core. Furthermore, the contact area of the second magnetic-conductive portion and the conductor Con is larger than 50% of the area of the footprint of the power converting device.

Figure 10:
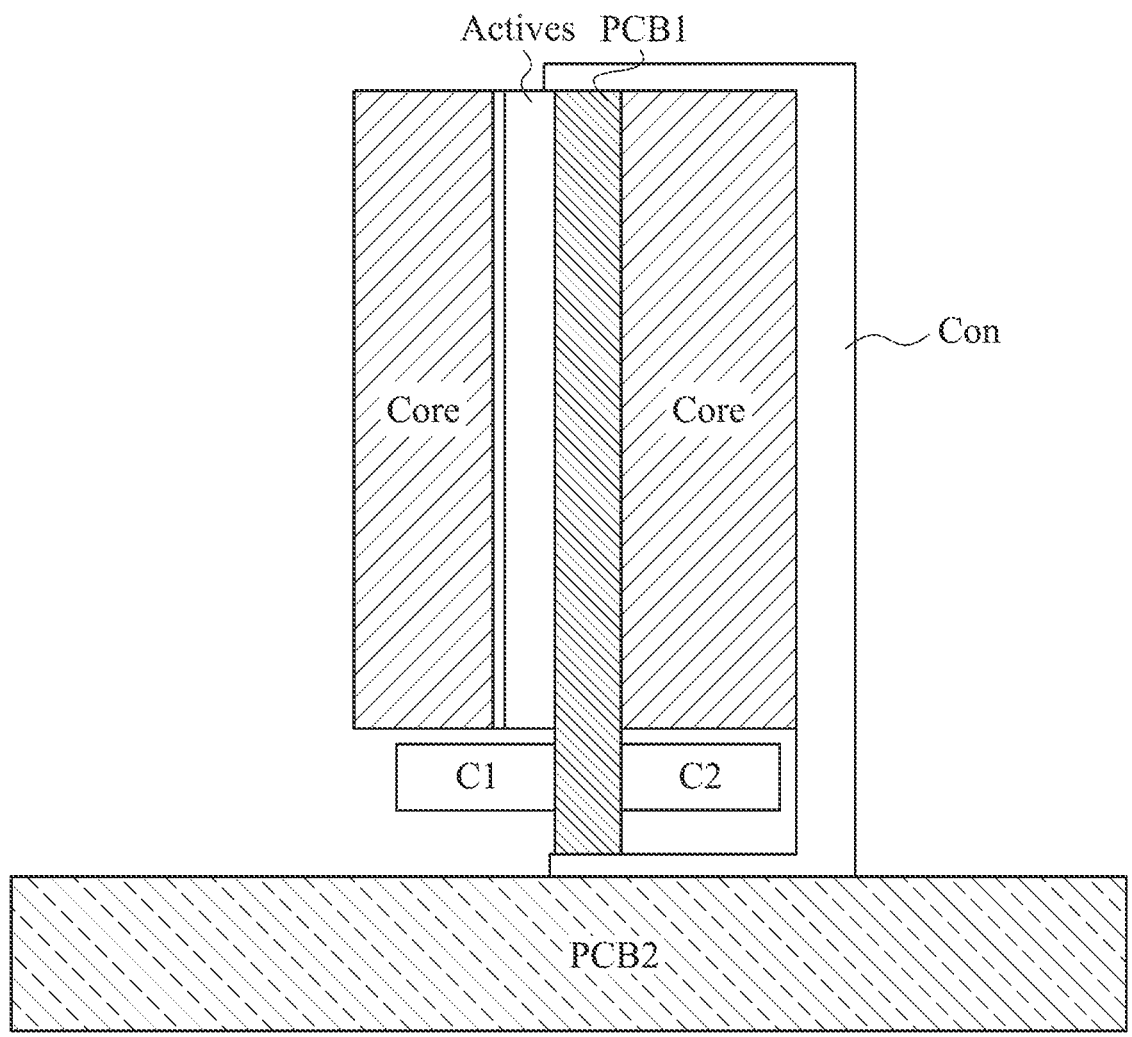
FIG. 10 is an application diagram of a power converting device according to embodiments of the present invention.

In a further embodiment, the conductor Con is used to couple with the external system (e.g., with the system board PCB2). Furthermore, the pure die surface of the pure die in the power semiconductor unit Actives and the plane of the system board PCB2 of the external system are parallel, that is, the power converting device is a lying installation. In addition, as shown in FIG. 10, the pure die surface and the plane of the system board PCB2 of the external system are vertical, that is, the power converting device is a vertical installation. Furthermore, when the pin of the electrical conductor Con of the current loop of the aforementioned embodiment is installed in the most outer side of the power element module, the power converting device may be a vertical installation. The advantage of using above configuration is that, the power converting device may have the smaller occupied area. Furthermore, when the above configuration is applied in the buck circuit, the noise of the ground pin GND may be reduced.

Figure 11A:
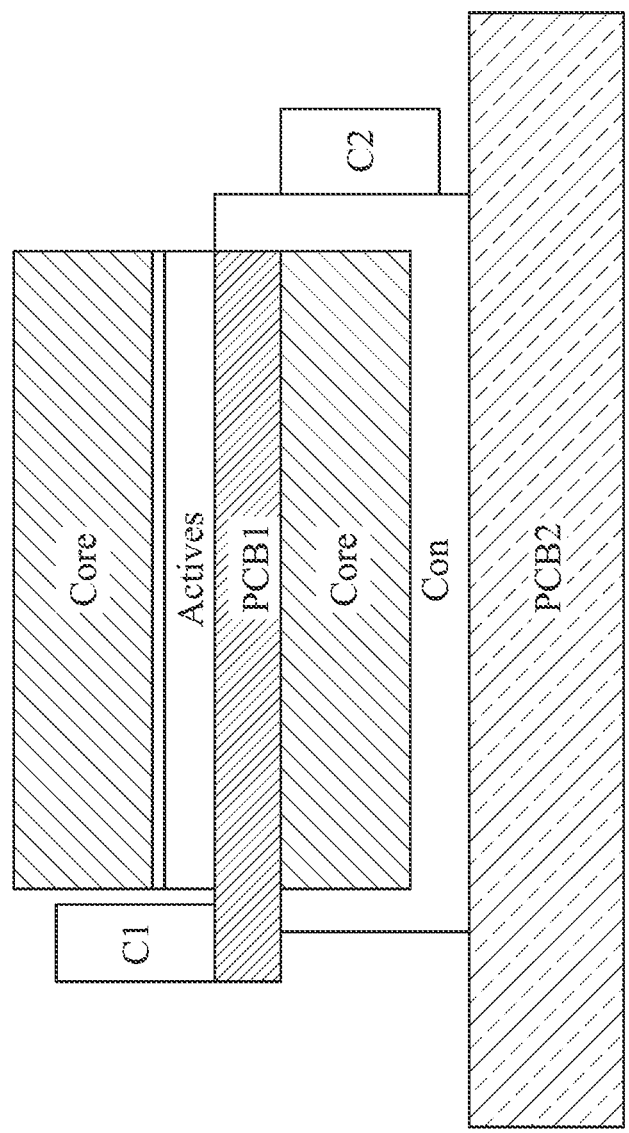
FIG. 11A is an application diagram of a power converting device according to embodiments of the present invention.

FIG. 11A is an application diagram of a power converting device according to embodiments of the present invention. In comparison with the power converting device of FIG. 9, the capacitor C2 of the power converting device of FIG. 11 is disposed in outer side of the conductor Con. In an embodiment, those skilled in the art may be free to choose whether adding the extra capacitors C1 and C2.

Figure 11B:
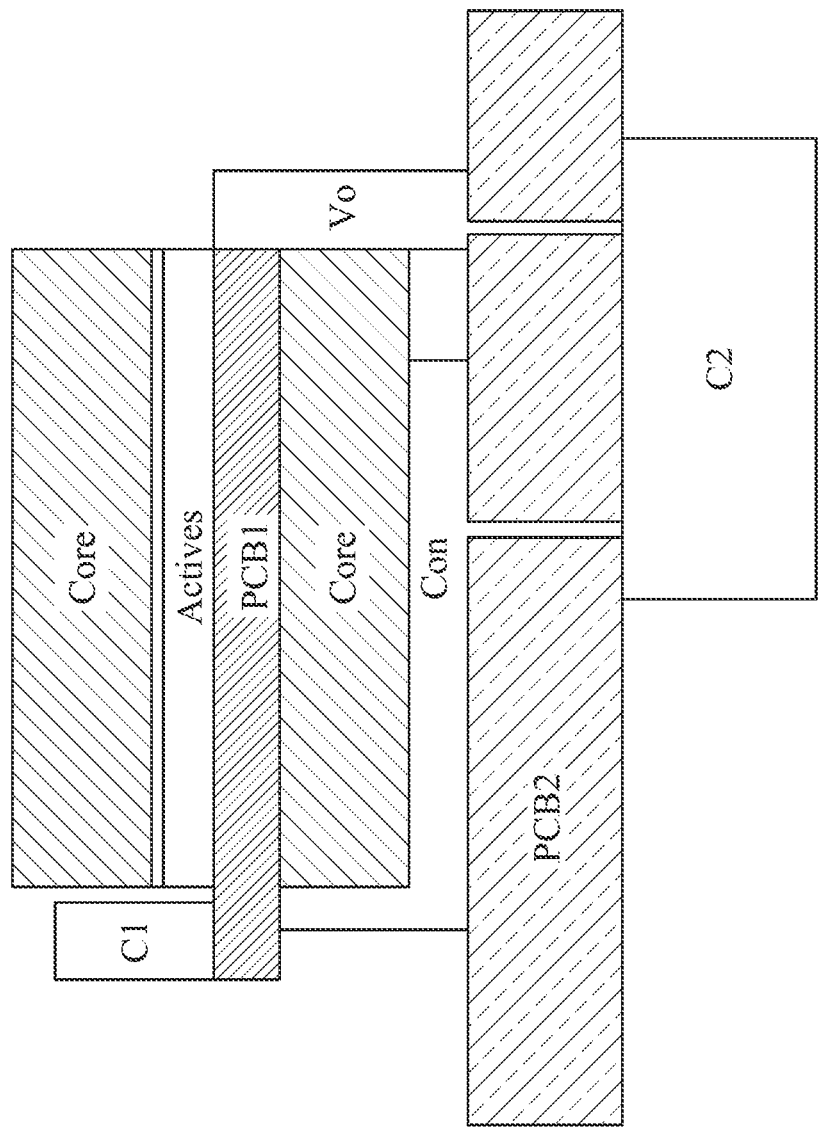
FIG. 11B is an application diagram of a power converting device according to embodiments of the present invention.
Figure 11C:
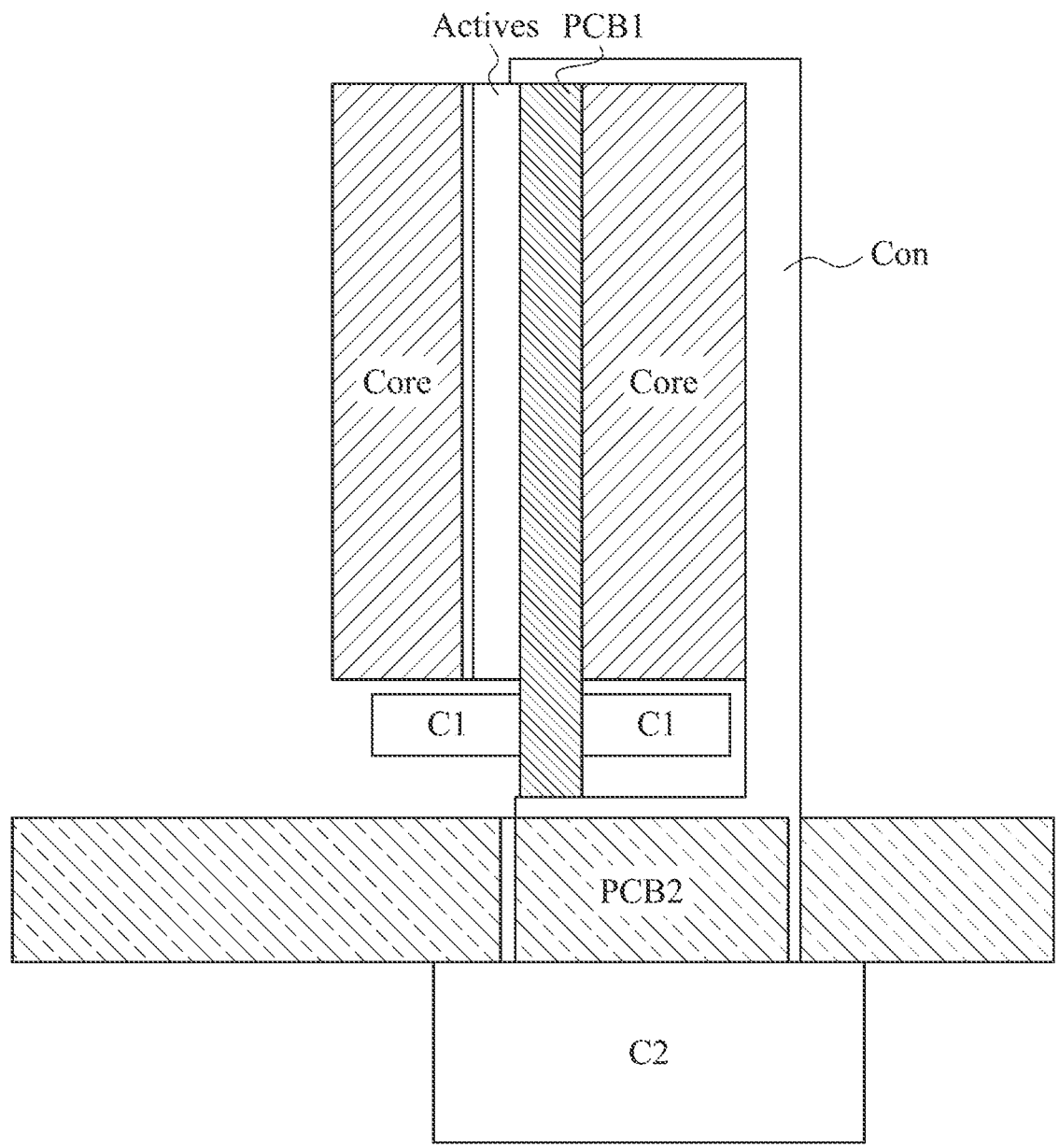
FIG. 11C is an application diagram of a power converting device according to embodiments of the present invention.

FIG. 11B is an application diagram of a power converting device according to embodiments of the present invention. FIG. 11C is an application diagram of a power converting device according to embodiments of the present invention. Two embodiments as shown in FIG. 11B and FIG. 11C, the capacitors C2 may be disposed on the client system board PCB2. The advantage of using above configuration is that, the space of the client system is fully used, and the main structure of the power converting device is simplified, and it is helpful for reducing the noise of the ground pin GND and the output pin Vo. The aforementioned embodiment is both suitable for the lying installation (such as FIG. 11B) and the vertical installation (such as FIG. 11C).

For example, in comparison with the power converting device of FIG. 11A, the capacitors C2 of the power converting device of FIG. 11B is disposed in system board PCB2 of the external system, and connected to the partial region (such as the portion which is disposed as the ground pin GND) of the conductor Con of the power converting device and the output pin Vo. In comparison with the FIG. 11B, the pure die surface of the pure die in the power semiconductor unit Actives of FIG. 11C and the plane of the system board PCB2 of the external system are vertical.

Figure 12:
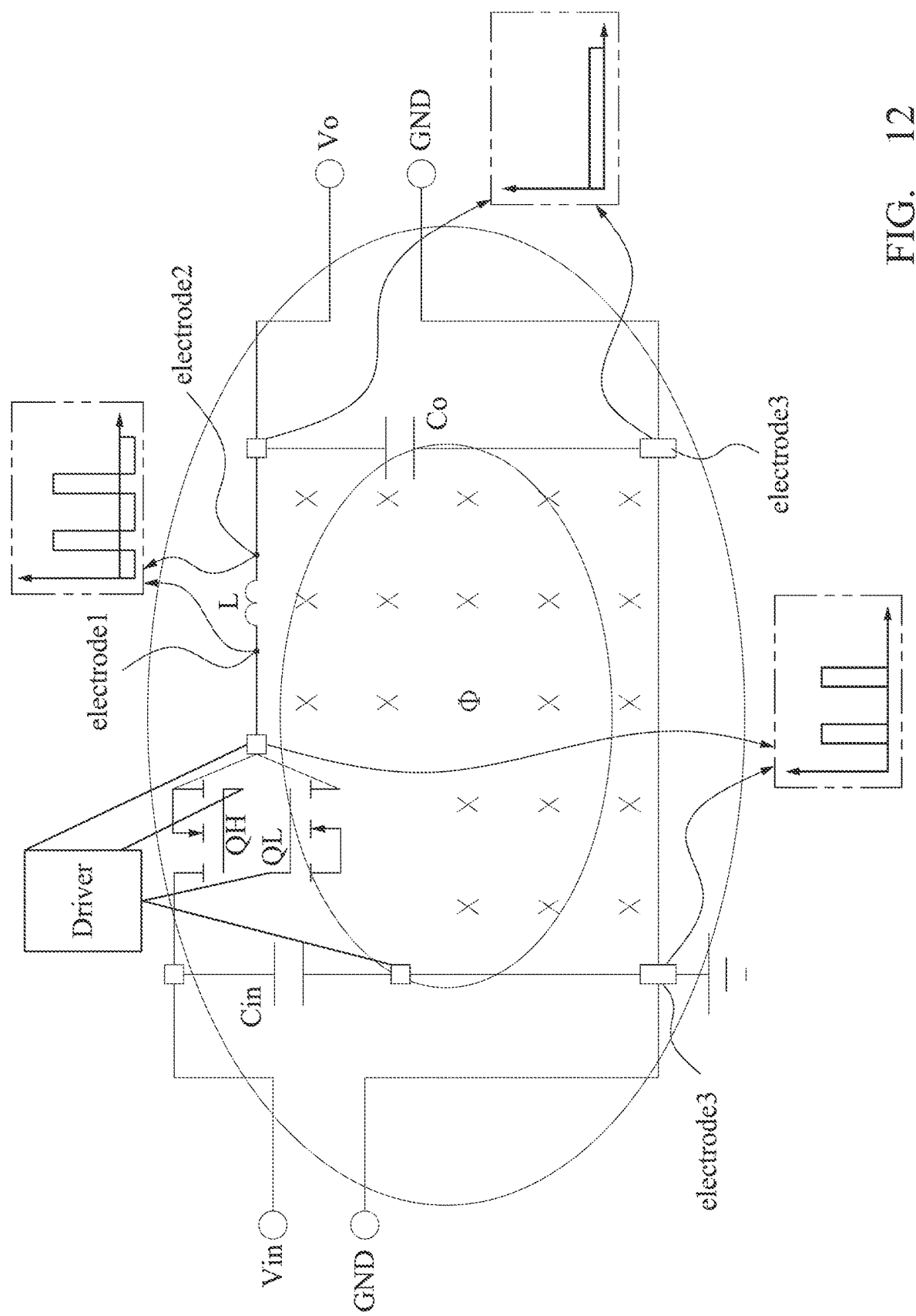
FIG. 12 is a schematic diagram of a power converting device which uses Dr. MOS according to embodiments of the present invention.
Figure 13A:
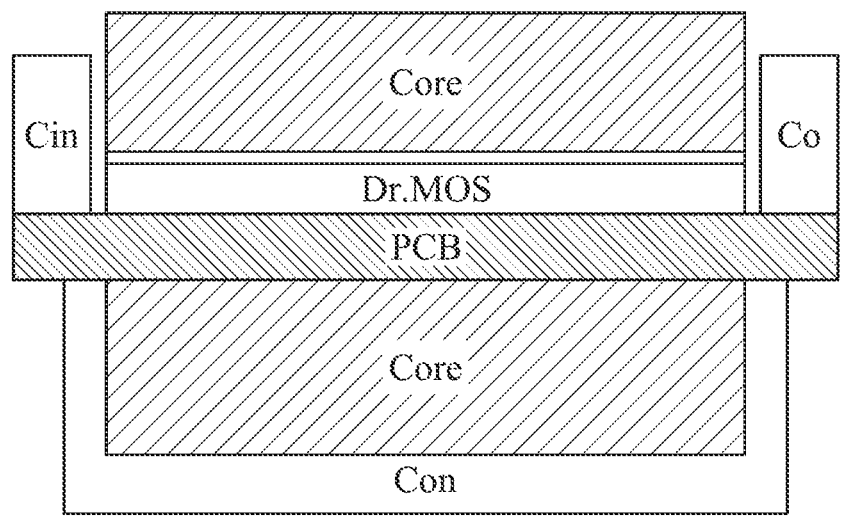
FIG. 13A is a schematic cross-sectional view of a power converting device according to embodiments of the present invention.
Figure 13B:
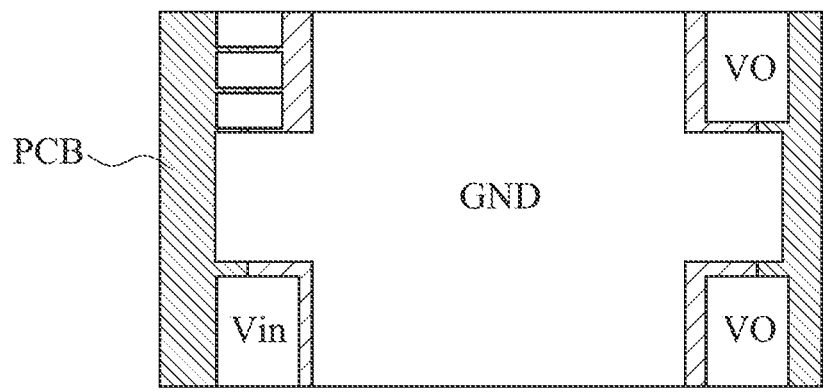
FIG. 13B is a schematic bottom view of the power converting device as shown in FIG. 13A according to embodiments of the present invention.
Figure 13C:
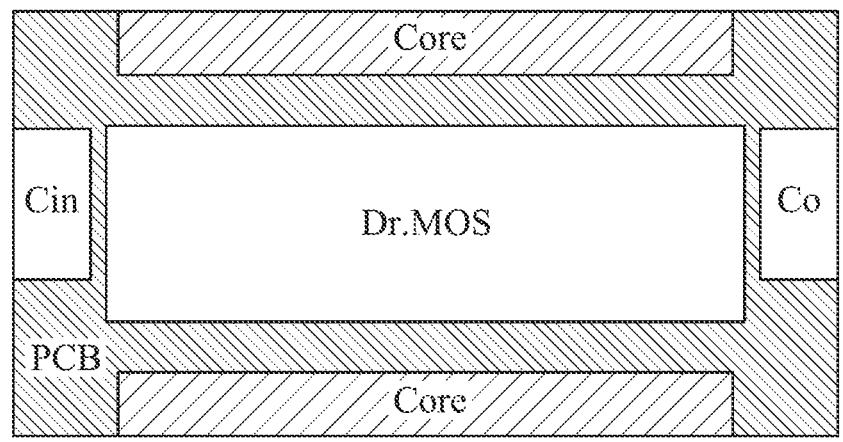
FIG. 13C is a schematic cross-sectional view of a power converting device according to embodiments of the present invention.
Figure 13D:
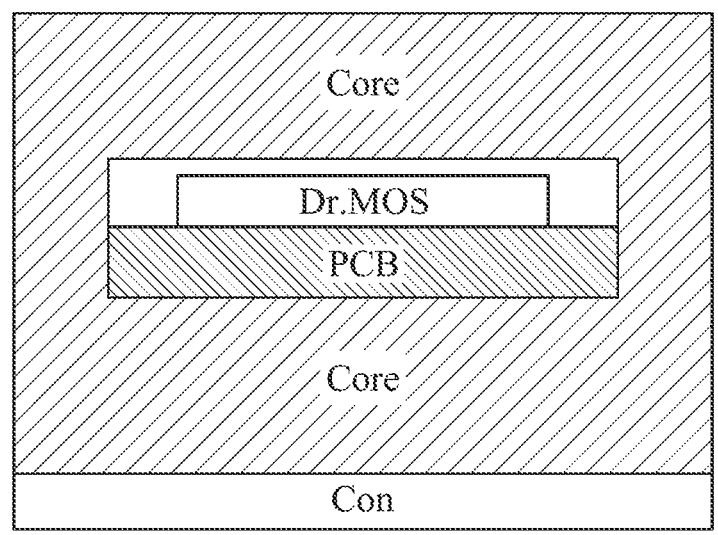
FIG. 13D is a schematic cross-sectional view of a power converting device according to embodiments of the present invention.

FIG. 12 is a schematic diagram of a power converting device which uses Dr. MOS according to embodiments of the present invention. FIG. 13A is a schematic cross-sectional view of a power converting device according to embodiments of the present invention. FIG. 13B is a schematic bottom view of the power converting device as shown in FIG. 13A according to embodiments of the present invention. FIG. 13C is a schematic cross-sectional view of a power converting device according to embodiments of the present invention. FIG. 13D is a schematic cross-sectional view of a power converting device according to embodiments of the present invention. It should be noted that, the shape of the window of the magnetic-conductive assembly Core will cause the direct effect on the volume and losses of the magnetic-conductive assembly Core. In present invention, the depth of the window of the magnetic-conductive assembly should be appropriate large to realize the smaller thickness and width of the iron core in the same AE, thereby reducing the height and width of the power converting device. Therefore, it needs to decide between the depth of the window of the magnetic-conductive assembly Core and the height of the power converting device. In general, the width of the window of the magnetic-conductive assembly Core is as small as better. The smaller width means the total width of the magnetic-conductive assembly Core is small, that is, the width of the power converting device is small, and the losses of the magnetic-conductive assembly Core are small, and there are no extra losses. Because the power element module needs to be placed in the window of the magnetic-conductive assembly Core, if the width of the window of the magnetic-conductive assembly Core is small, then it needs to correspondingly design the power element module, so that both of them may match with each other.

Therefore, the power element module may be disposed as an elongated shape, and the dimensions of the length and the width are both as small as better. For the best results, the power element module of the present invention may be used in highly integrated way, especially the power semiconductor unit Actives therein, which may be integrated to a package device. In an embodiment, with the buck circuit as an example, the aforementioned power semiconductor unit Actives may be integrated the power semiconductor devices QH and QL and the driving element Driver, and this driving element Driver may be used to drive the power semiconductor devices QH and QL. The aforementioned power semiconductor devices QH and QL and the driving element may be integrated as the Dr. MOS (Driver and Metal-Oxide-Semiconductor Field-Effect Transistor). Furthermore, the power converting device comprises three power electrodes, such as the electrode 1, the electrode 2, and the electrode 3. The aforementioned electrode 1 is a series node of the power switches QH and QL, the electrode 3 is the ground pin GND. It should be noted that, the configuration way of the power converting device of FIG. 13B is similar to the configuration way of the power converting device of FIG. 1D, the configuration way of the power converting device of FIG. 13C is similar to the configuration way of the power converting device of FIG. 1B, and the configuration way of the power converting device of FIG. 13D is similar to the configuration way of the power converting device of FIG. 1C. Therefore, a detailed description regarding the configuration ways of the power converting devices of FIGS. 13B-13D will be omitted herein for the sake of brevity.

Figure 14:
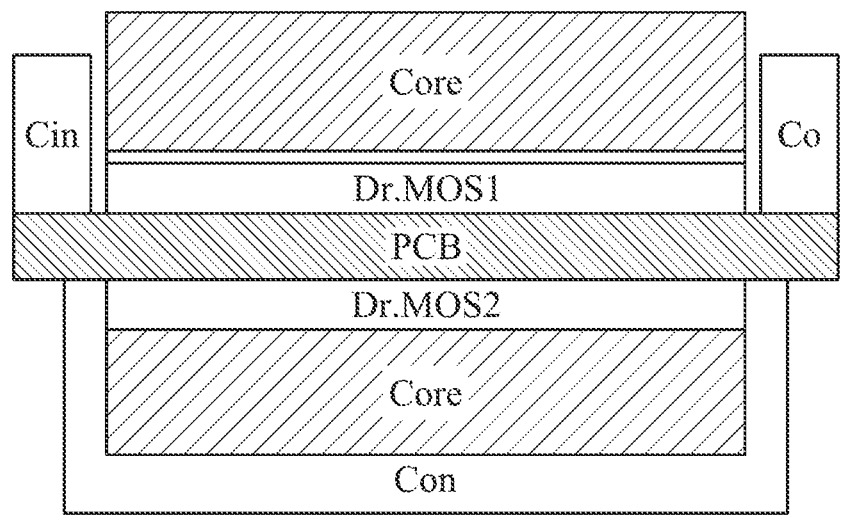
FIG. 14 is a schematic cross-sectional view of a power converting device according to embodiments of the present invention.
Figure 15A:
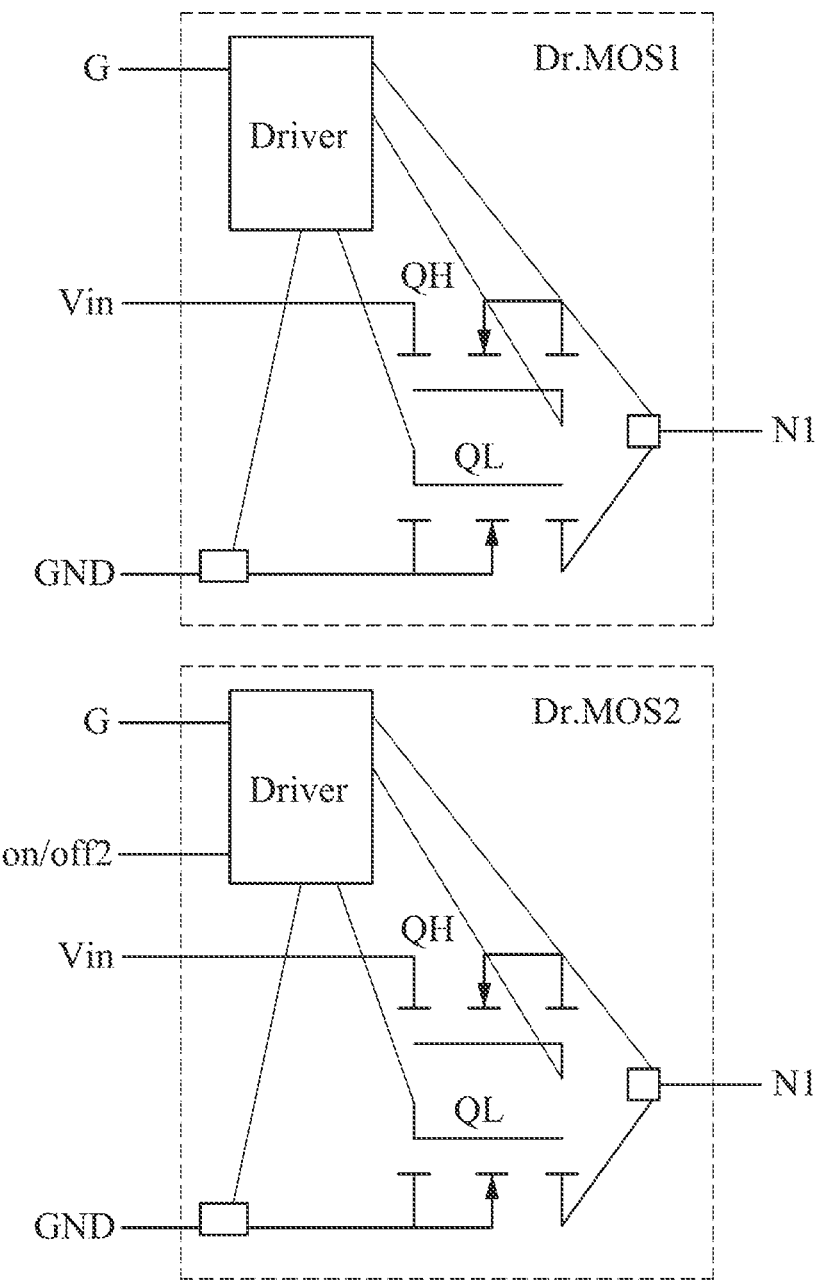
FIG. 15A is a schematic diagram of Dr. MOS according to embodiments of the present invention.
Figure 15B:
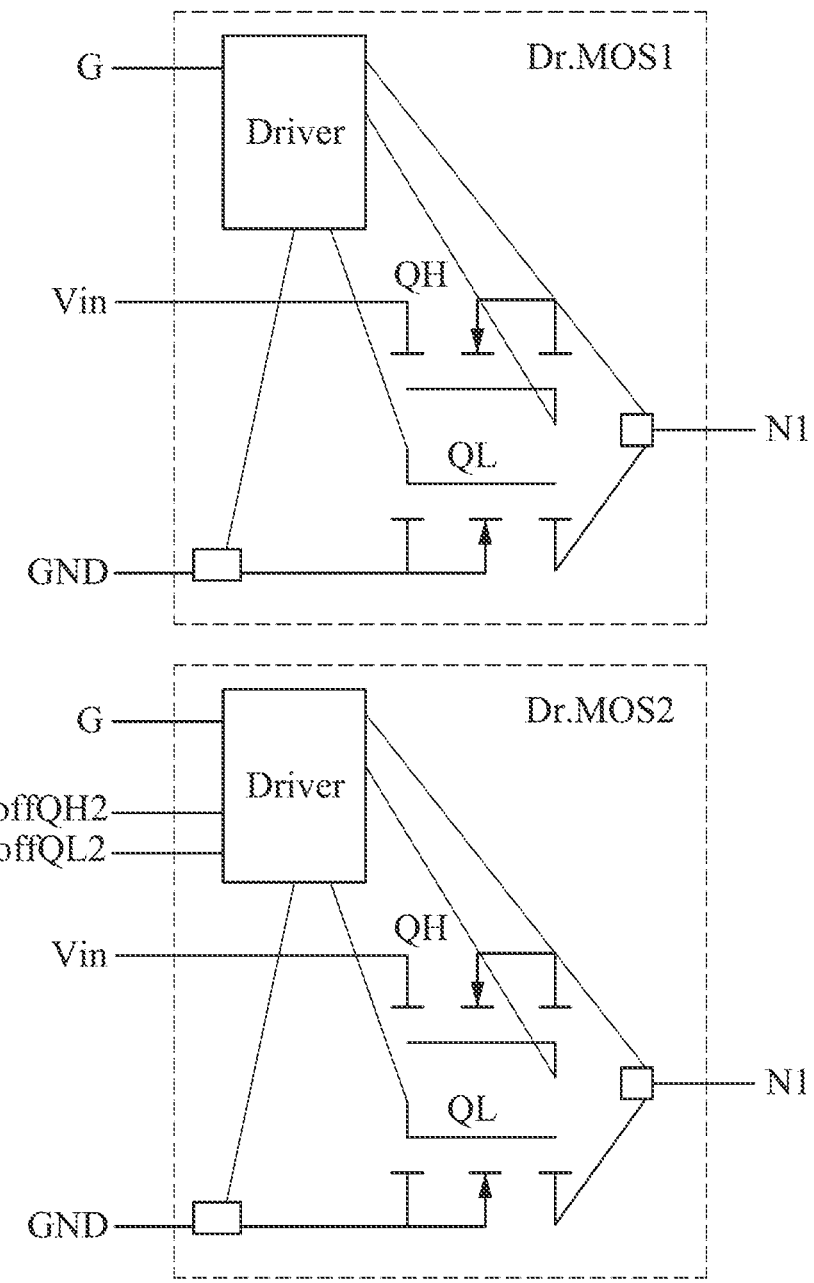
FIG. 15B is a schematic diagram of Dr. MOS according to embodiments of the present invention.

FIG. 14 is a schematic cross-sectional view of a power converting device according to embodiments of the present invention. FIG. 15A is a schematic diagram of Dr. MOS according to embodiments of the present invention. FIG. 15B is a schematic diagram of Dr. MOS according to embodiments of the present invention. Because each of the Dr. MOS has its power limitation, as shown in FIG. 14, in order to let power density is not limited to the current capacity of the Dr. MOS, the height of the power converter may be appropriately sacrifice. The Dr. MOS1 and the Dr. MOS2 are both placed on the upper and lower surface of the carrier board PCB. In an embodiment, the Dr. MOS1 and the Dr. MOS2 may be used in parallel. The Dr. MOS1 and the Dr. MOS2 may use all pins in parallel directly, including using the same pulse width modulation signal pin G, the input pin Vin, the ground pin GND, and the electrode N1.

Please refer to FIG. 15A, because there are two independent Dr. MOS be used in parallel, the efficiency at the light loading may be promoted, as described later. If at least one of the two Dr. MOS has the function of the switch, for example, the power converting device is under the situation of the heavy loading, the Dr. MOS1 and the Dr. MOS2 are both turned on to be simultaneously performed the power conversion for an input Vin to generate an output, and share the current. On the other hand, the power converting device is under the situation of the light loading, one of the Dr. MOS1 and the Dr. MOS2 is controlled to turn off (e.g., the Dr. MOS1 is controlled to turn off), so that the other one of the Dr. MOS1 and the Dr. MOS2 (e.g., the Dr. MOS2) is performed a power conversion for an input Vin to generate an output, thereby saving the losses such as the driving losses.

As shown in FIG. 15B, two MOSFETs QH and QL of at least one of the Dr. MOS1 and the Dr. MOS2 (e.g., the Dr. MOS2) may have the function of the switch respectively. Therefore, for the different work situation, four MOSFETs of the Dr. MOS1 and the Dr. MOS2 may be arbitrarily chosen for matching. For example, two MOSFETs QH and two MOSFETs QL work together, or two MOSFETs QH and one MOSFET QL work together, or one MOSFET QH and two MOSFETs QL work together. Thereby, each of the situations may reach the better efficiency.

Figure 16A:
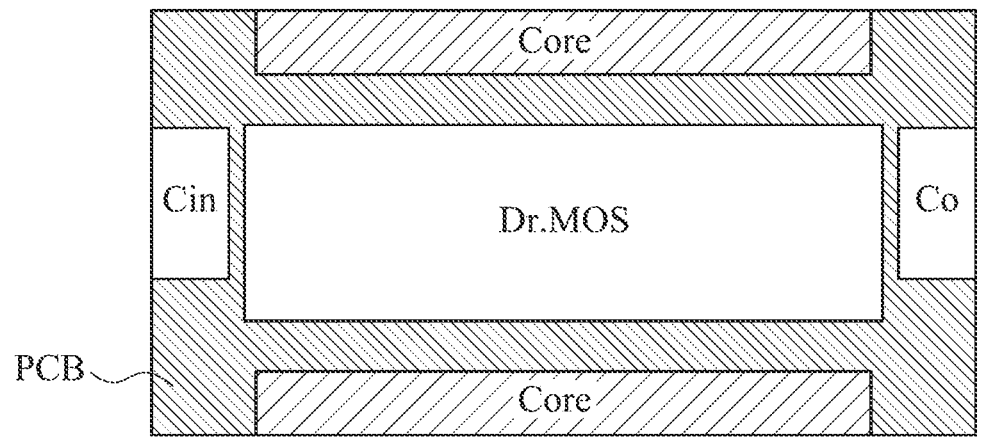
FIG. 16A is a schematic cross-sectional view of a power converting device according to embodiments of the present invention.

FIG. 16A is a schematic cross-sectional view of a power converting device according to embodiments of the present invention. As shown in the figure, it exemplarily shows the shape and the arrangement way of the pins of the Dr. MOS which is suitable to the present invention. For example, the Dr. MOS is disposed on the carrier board PCB, and its shape may be rectangular to match the shape of the window of the aforementioned magnetic-conductive assembly Core. The series node of the power semiconductor devices QH and QL, for example, the electrode N1 may be disposed in the most outer side, that is, a shorter side of the Dr. MOS, for complying with the current direction, thereby easily using and reducing the losses of the carrier board PCB. Furthermore, the input capacitor Cin and the output capacitor Co are disposed in two opposite sides (e.g., the left side and the right side) of the Dr. MOS respectively.

Figure 16B:
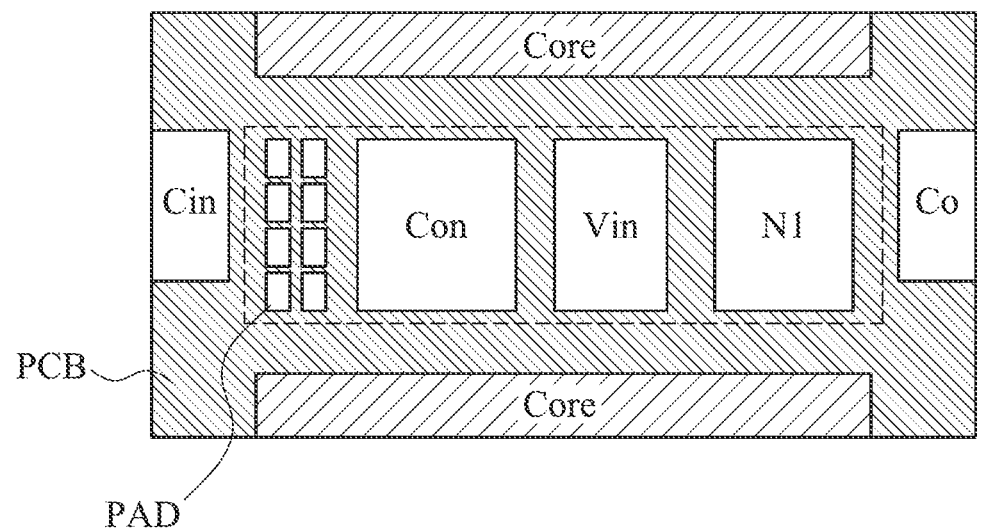
FIG. 16B is a schematic cross-sectional view of a power converting device according to embodiments of the present invention.
Figure 16C:
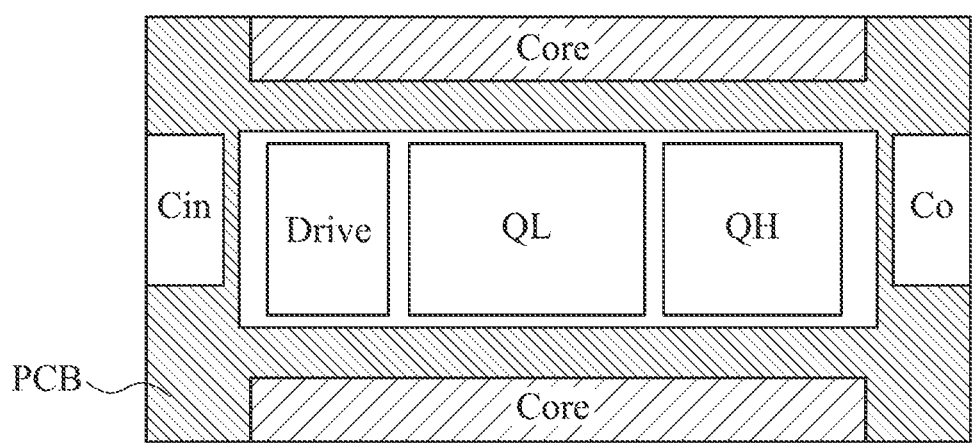
FIG. 16C is a schematic cross-sectional view of a power converting device according to embodiments of the present invention.

FIG. 16B is a schematic cross-sectional view of a power converting device according to embodiments of the present invention. FIG. 16C is a schematic cross-sectional view of a power converting device according to embodiments of the present invention. Please refer to FIG. 16B, in the present embodiment, the coupling node between two MOSFETs QH and QL is the electrode N1. Furthermore, the power converting device further comprises the input pin Vin and the ground pin GND. The input pin Vin is coupled to one of the two MOSFETs QH and QL, the ground pin GND is coupled to the other one of the two MOSFETs QH and QL. Because the current value of the three power poles of the buck converter is usually the electrode N1>the ground pin GND>the input pin Vin. Therefore, in order to be easily used and reduce the losses of the carrier board PCB. The arrangement of the aforementioned power poles may be the ground pin GND, the input pin Vin, and the electrode N1 sequentially. Thus, two poles which have the largest current may be disposed in two longer sides of the Dr. MOS, so that the large current board is placed in two opposite sides of the window of the magnetic-conductive assembly Core respectively, and the current is directly elicited through the Dr. MOS, so that the current does not need to be elicited through the carrier board PCB inside the window of the magnetic-conductive assembly. Thus, the carrier board PCB requires the minimal resource.

In another embodiment, because the Dr. MOS cannot avoid having the signal board PAD and the surrounding components, in order to reduce too much resource occupied by the signal board PAD and the surrounding components, the signal board PAD may be disposed in the most outer side. That is, the pin arrangement of the Dr. MOS may be the signal board PAD, the ground pin GND, the input pin Vin, and the electrode N1 sequentially. Please refer to FIG. 16C, the Dr. MOS may comprise a driving element Driver, a high-side MOS QH, and a low-side MOS QL. In order to let aforementioned pin arrangement realize the smaller internal package resistance of the Dr. MOS, the arrangement within the pure die may be also the driving element Driver, the low-side MOS QL, and high-side MOS QH correspondingly.

Figure 17A:
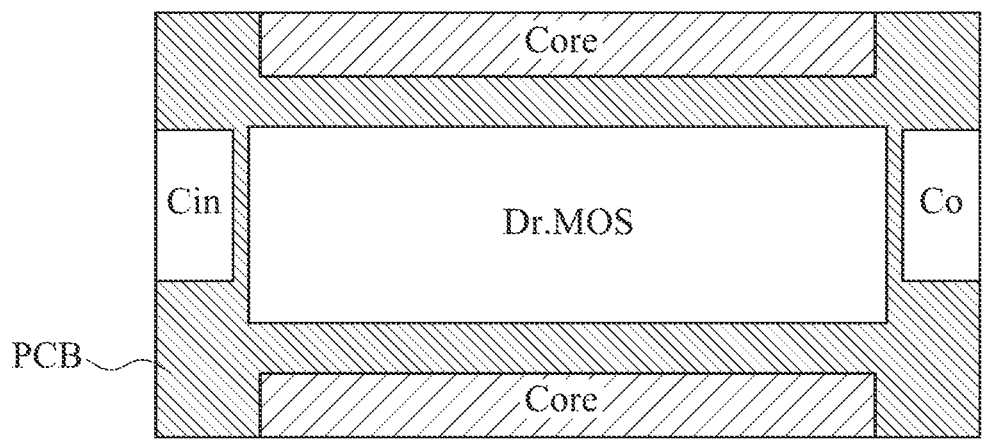
FIG. 17A is a schematic cross-sectional view of a power converting device according to embodiments of the present invention.
Figure 17B:
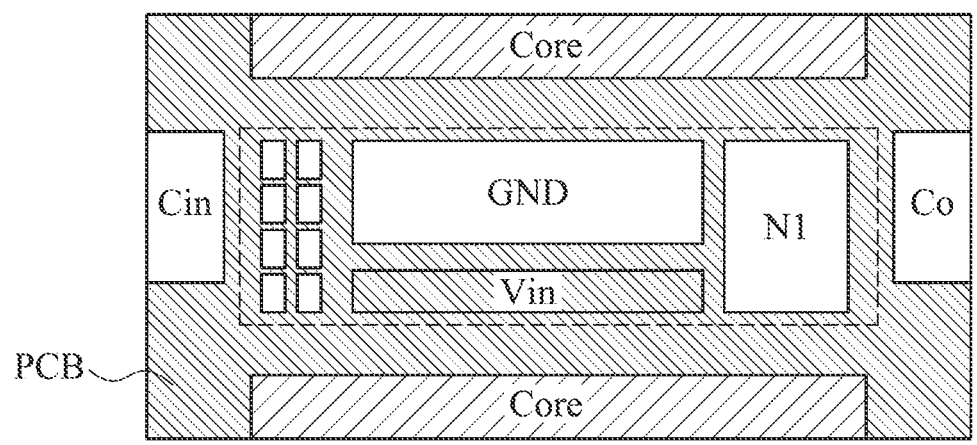
FIG. 17B is a schematic cross-sectional view of a power converting device according to embodiments of the present invention.
Figure 17C:
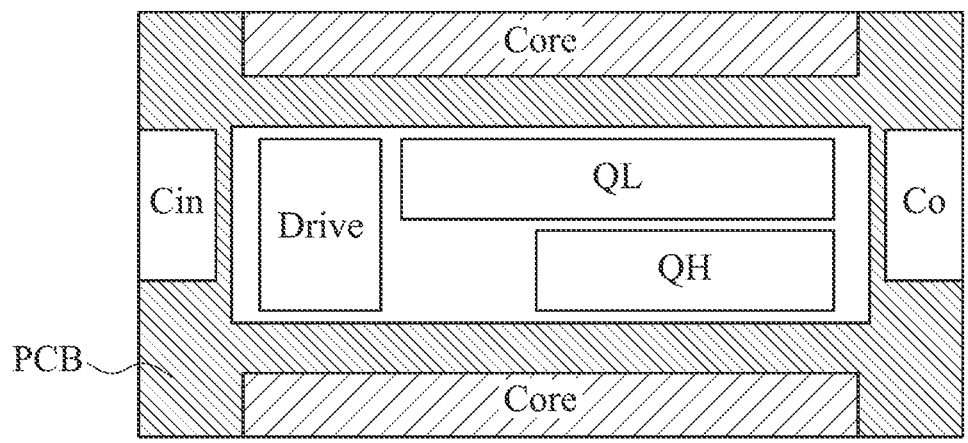
FIG. 17C is a schematic cross-sectional view of a power converting device according to embodiments of the present invention.
Figure 17D:
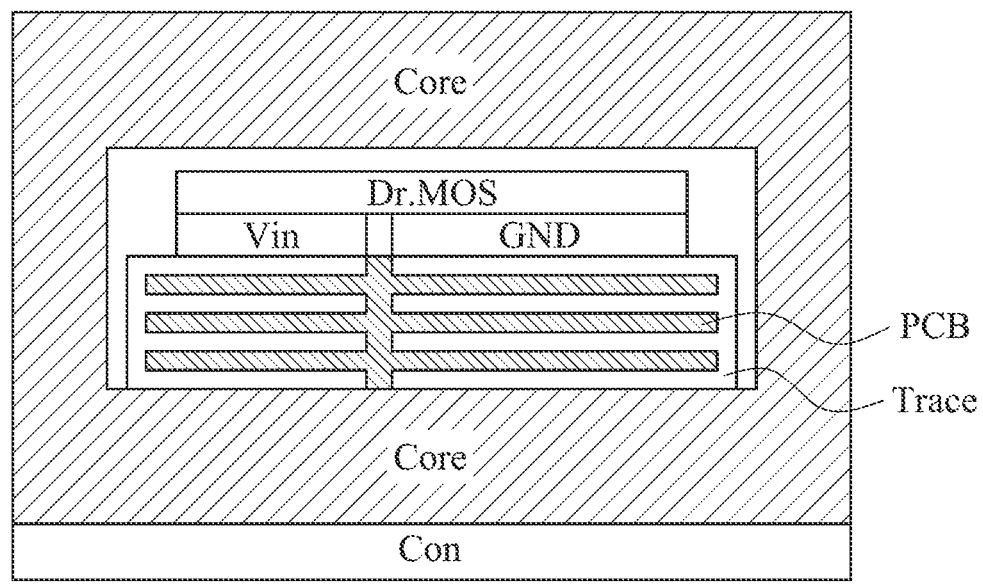
FIG. 17D is a schematic cross-sectional view of a power converting device according to embodiments of the present invention.

FIGS. 17A-17D are the schematic cross-sectional views of a power converting device according to embodiments of the present invention. In comparison with FIGS. 16A-16C, the power converting device as shown in FIGS. 17A-17D shows another configuration way of the components inside the Dr. MOS. If the arrangement of the pure die inside the Dr. MOS is as shown in FIG. 17C, the high-side MOSFET QH and the low-side MOSFET QL coincide in the camber of the magnetic-conductive assembly Core, such as the parallel arrangement or even stacking arrangement, then the input pin Vin and the ground pin GND (the partial portion of the conductor Con) of the Dr. MOS also need to be arranged in parallel correspondingly as shown in FIG. 17B, and disposed in the directions of two longer sides of Dr. MOS respectively.

Specifically, as shown in FIG. 17B, the input pin Vin is coupled to the high-side MOSFET QH, the ground pin GND is coupled to the low-side MOSFET QL, the input pin Vin and the ground pin GND (the partial portion of the conductor Con) are arranged in parallel, and the electrode N1 is disposed in one side of the structure formed by parallel arrangement of the input pin Vin and the ground pin GND. As shown in FIG. 17C, the low-side MOSFET QL and the high-side MOSFET QH are arranged in parallel, the low-side MOSFET QL is disposed in upper side, and the high-side MOSFET QH is disposed in lower side. The driving element Driver is disposed in one side of the structure formed by parallel arrangement of the low-side MOSFET QL and the high-side MOSFET QH.

Because the width of the window of the magnetic-conductive assembly Core requires a design as narrow as possible, the carrier board PCB in the aforementioned window also requires a very narrow design. Thus, the dimension of the carrier board PCB is smaller, so that the carrier board PCB is hard to dispose the required components on it. In order to expand its equivalent area, the side of the carrier board PCB may be used together to significantly increase the equivalent area of the carrier board PCB. In other words, two sides of the carrier board PCB in the window may be plated copper to from the conductive line layer Trace, and it may be the via which has the larger area, thereby helping the parallel between each of the layers of the multi-layer carrier board PCB to reduce the resistance.

Figure 18:
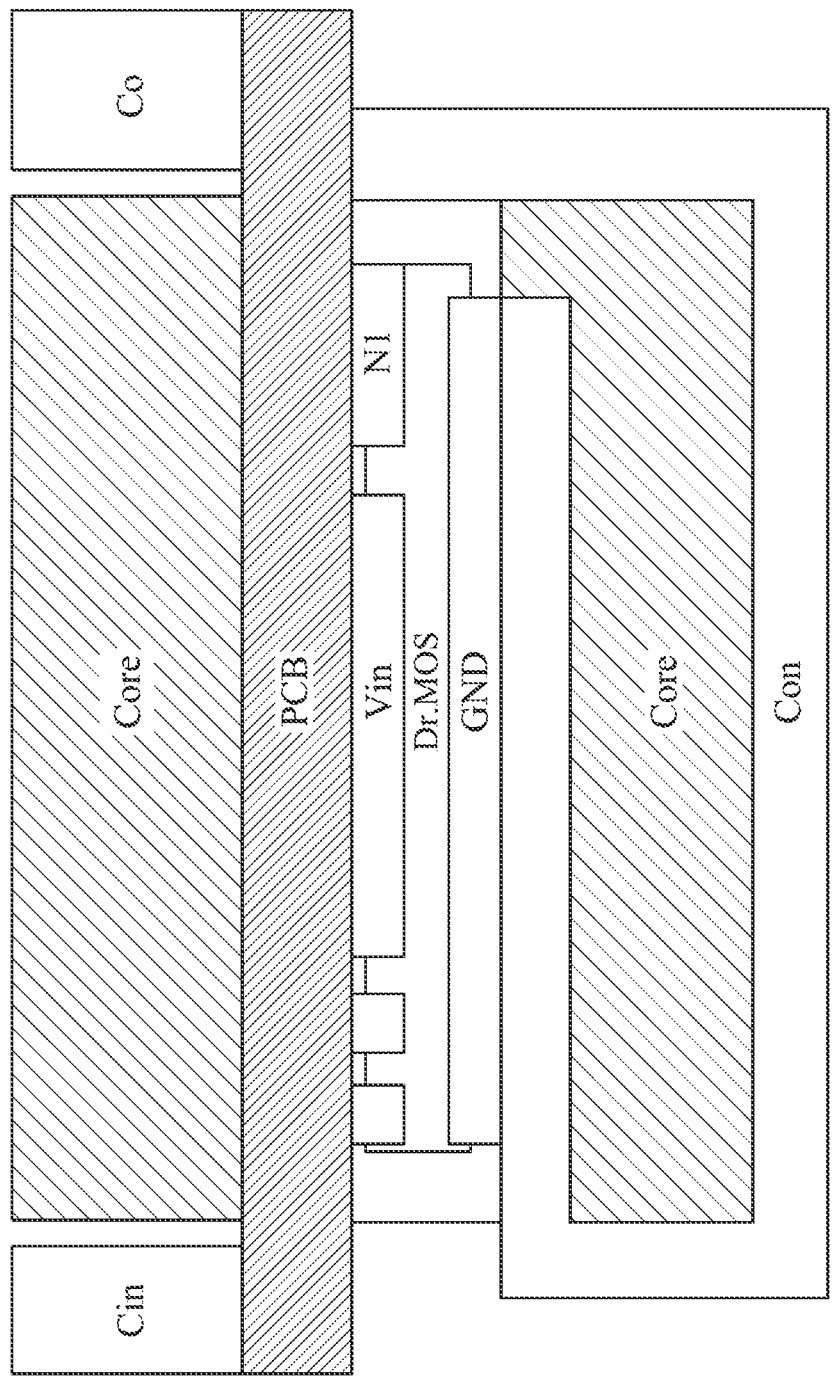
FIG. 18 is a schematic cross-sectional view of a power converting device according to embodiments of the present invention.

FIG. 18 is a schematic cross-sectional view of a power converting device according to embodiments of the present invention. As shown in the figure, the Dr. MOS is disposed as a rectangle. The aforementioned rectangle has the longer sides and the shorter sides, the coupling node between the MOSFET QH and QL is an electrode N1, and the electrode N1 is disposed near the shorter sides. Furthermore, the power converting device further comprises the input pin Vin and the ground pin GND. The input pin Vin is disposed on the upper surface of the Dr. MOS. The ground pin GND is disposed on the lower surface of the Dr. MOS.

Figure 19A:
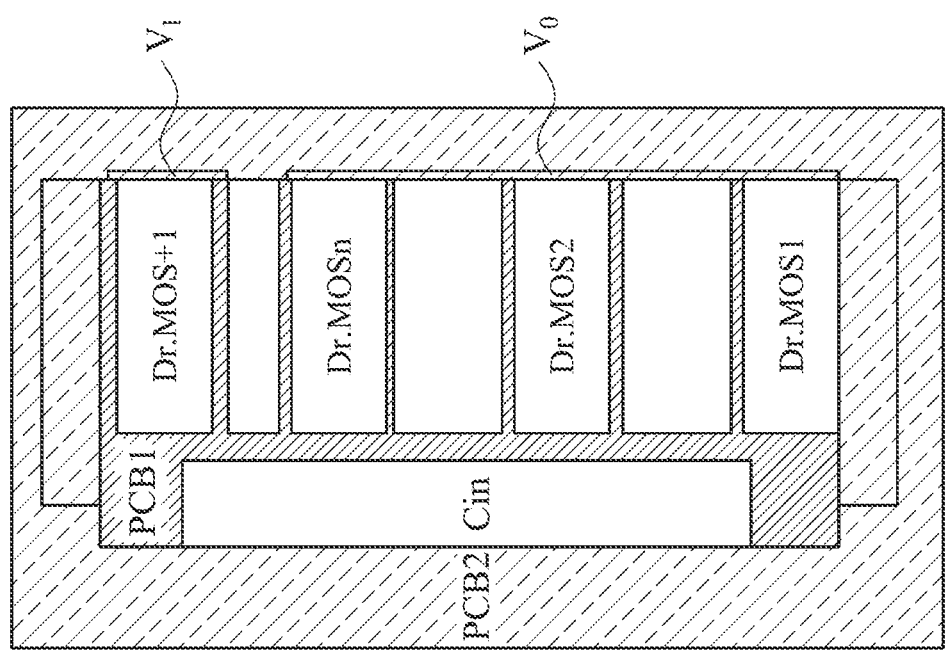
FIG. 19A is an application diagram of a power converting device according to embodiments of the present invention.
Figure 19C:
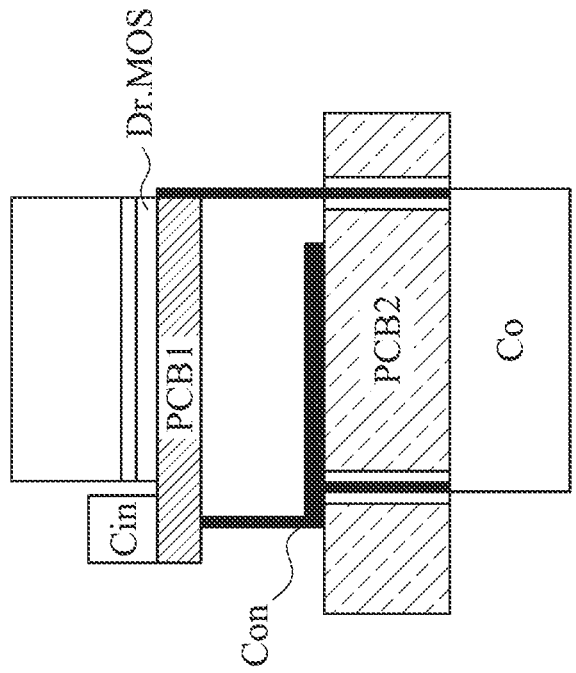
FIG. 19C is an application diagram of a power converting device according to embodiments of the present invention.
Figure 19B:
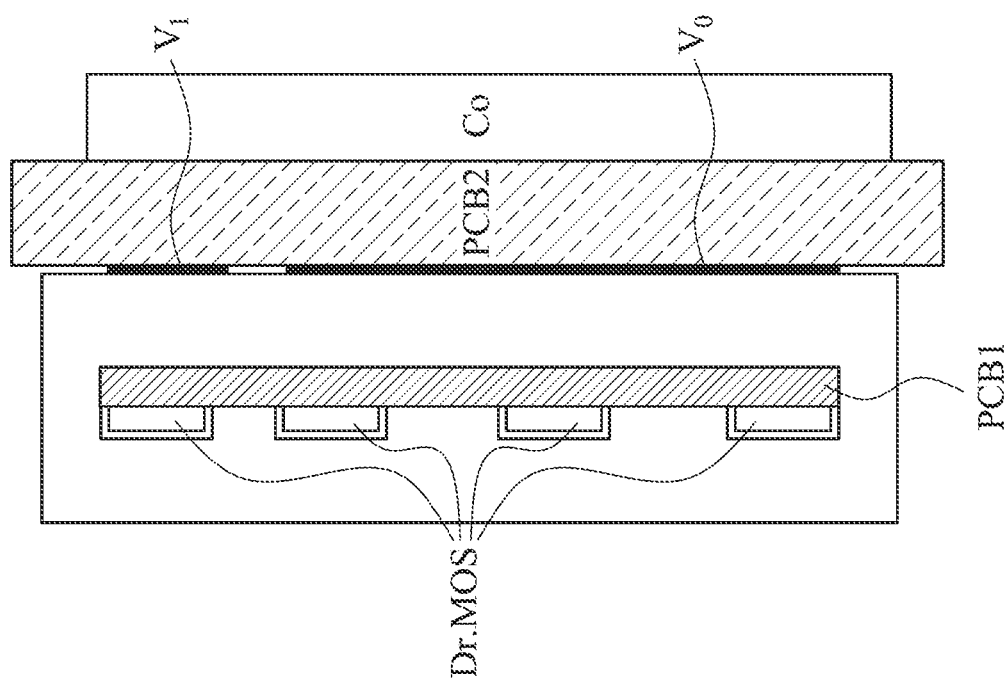
FIG. 19B is an application diagram of a power converting device according to embodiments of the present invention.

FIGS. 19A-19C are the application diagrams of a power converting device according to embodiments of the present invention. In the buck converter, in order to reduce the ripple current, the way of the multi-phase interleaving parallel is usually used. The present invention is applied to the aforementioned buck converter, and some effect may be achieved. Please refer to FIGS. 19A-19C, the present invention may integrate the multi-phase buck converter in the structure of the single carrier board PCB. The aforementioned buck converter may be parallel into one channel output, and also may be parallel into the multiple channel outputs. For example, FIGS. 19A-19C reveal one of the embodiments of the present invention, the n-channel outputs of the buck converter are parallel to constitute a single output Vo with the large current, and the Dr. MOS+1 constitute another channel output V1. The Dr. MOS1-Dr. MOSn are the active components of each channel of the output Vo, and the Dr. MOS+1 belongs to the output V1.

Because these buck converters supply power for the same load, they may be near disposed. Thus, the inductors of these buck converters may be integrated. As the present embodiment, their magnetic-conductive assemblies Core are integrated, and they share some bars to reduce the volume. However, each of the buck converters has the dedicated channel of the magnetic loop and matches its dedicated current loop to form inductance which the current loop needs. Because these buck converters share one input voltage source, their input capacitors Cin may be placed in the same side of the magnetic-conductive assemblies Core, so that these buck converters share the capacitors Cin, thereby realizing convenient layout and reducing the amount of the capacitors Cin. Thus, the multi-phase buck converters share one magnetic core combination, but have each dedicated magnetic window to let each current loop intersect its magnetic loop. And the multi-phase buck converters share one carrier board PCB at the same time, which is helpful for realizing the structure and manufacturing.

Please refer to FIGS. 19A-19C, the power element module comprises plural power semiconductor units Dr. MOS1-Dr. MOSn, and the power converting device comprises plural conductors Con and plural magnetic windows. Each of the conductors Con is coupled to the power semiconductor units Dr. MOS-Dr. MOSn correspondingly, plural current loops are formed between the power element modules and the conductors, and plural magnetic loops are formed in the magnetic windows. The current loops intersect the magnetic loops to form inductance which the current loops need. In the structure, the input capacitor Cin is disposed in the left side of the magnetic-conductive assembly Core, and the pins of the output Vo and the output V1 are disposed in the right side of the magnetic-conductive assembly Core. Each of the windows faces the input capacitor Cin and the output Vo and V1, and each of the magnetic windows is arranged in parallel from top to bottom. There is at least one magnetic column to separate each of the magnetic windows, so that each channel of the buck converter has dedicated magnetic channel. In other words, the said magnetic core combination shows the characteristics as follow: having two relatively longer upper and lower magnetic covers; having plural magnetic columns between two covers; forming plural magnetic windows; closing to of each of the magnetic windows and; forming the magnetic loop surrounding the magnetic window by the magnetic column and the partial magnetic covers which are close to the specified magnetic window; intersecting the current loop which passes through the magnetic window; and forming required inductance. Most depth of the magnetic window is occupied by the power element module, so that the conventional coil rarely exist, which reduces the path of the current loop. Therefore, the present invention has the higher power density, and has the higher efficiency due to have the shorter current path. In the figures, the output capacitor Co is disposed on the client system board PCB2, however, this is only a kind of the embodiments, and this is not limited to the present invention. Furthermore, it may be applied to two channel outputs constituted by the multi-phase buck converter, but the present invention may be used in the one channel output or more than two channel outputs constituted by the multi-phase buck circuit. In other words, the power semiconductor units may be connected in parallel to provide one channel output or the power semiconductor units are independent with each other to provide multiple channel outputs.

Figure 20C:
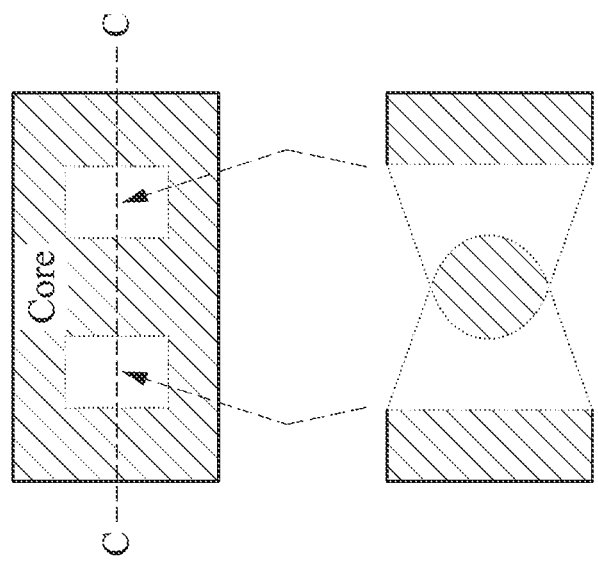
FIG. 20C is a schematic diagram of an iron core according to embodiments of the present invention.
Figure 20B:
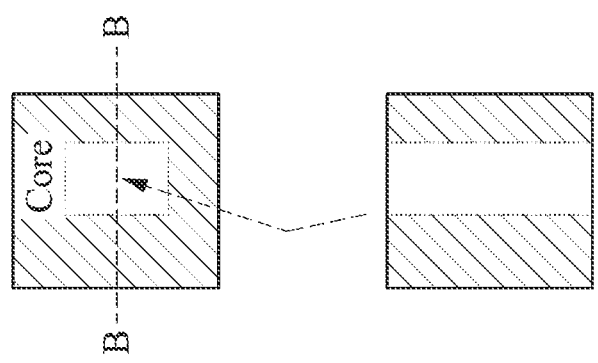
FIG. 20B is a schematic diagram of an iron core according to embodiments of the present invention.
Figure 20A:
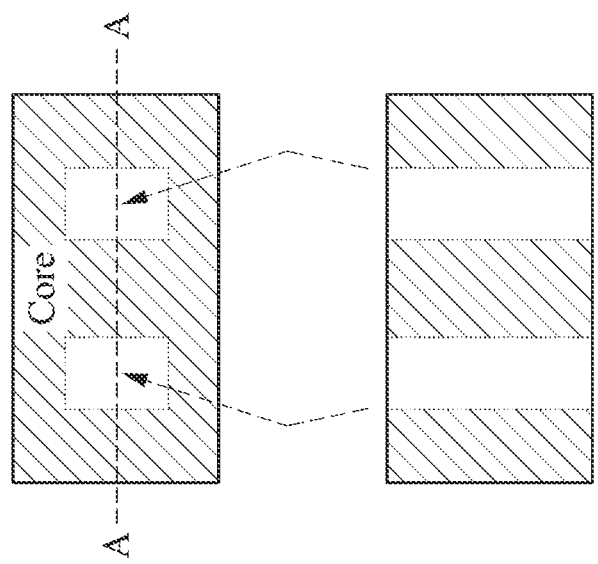
FIG. 20A is a schematic diagram of an iron core according to embodiments of the present invention.

FIG. 20A is a schematic diagram of a magnetic core according to embodiments of the present invention. FIG. 20B is a schematic diagram of a magnetic core according to embodiments of the present invention. FIG. 20C is a schematic diagram of a magnetic core according to embodiments of the present invention. Please refer to FIGS. 20A-20C, according to the specification, the definition of the window of the magnetic-conductive assembly Core and the definition of the depth d of the window is the key point. To avoid ambiguity, FIGS. 20A-20C define the aforementioned parameters in detail, and the figures show the definition of the window region of each kind of the magnetic cores and the definition of the depth d of the window. The window is the space which is used to place winding inside the magnetic core; the depth d of the window is the average value of the length of the window which has the same direction (the angle is less than 45 degrees) with the equivalent current of the winding (the current loop for the present invention) within the window. Furthermore, in order to differentiate from the existing technology, the inductor of the present invention may be defined as: the inductor for realizing the function of the circuit. Such as the rectifier inductor L of the output side of the buck converter, the storage inductor L of the input side of the Boost converter, the rectifier inductor of the output side of the circuit having the transformer, and the storage/resonant inductor of the input side of the DC/DC circuit having the transformer.

Furthermore, the said current loop of the present invention is an inductive AC current loop which needs to have inductance of the aforementioned inductor, an AC loop which needs to have inductance for realizing a function of the circuit. Certainly, as described above, the current of the AC loop may be the sum of the AC and DC, as the inductor current of the buck converter. The biggest difference between the present invention and the existing technology is that, the existing technology realizes inductance which the current needs by an inductance element (e.g., choke) which independently exist. And the required inductance of the present invention is formed by AC current of the circuit intersecting the magnetic loop formed by the magnetic core, so that the winding of the inductor which is independently exist, may be removed or significantly reduced, thereby reducing the volume and the losses.

Figure 21:
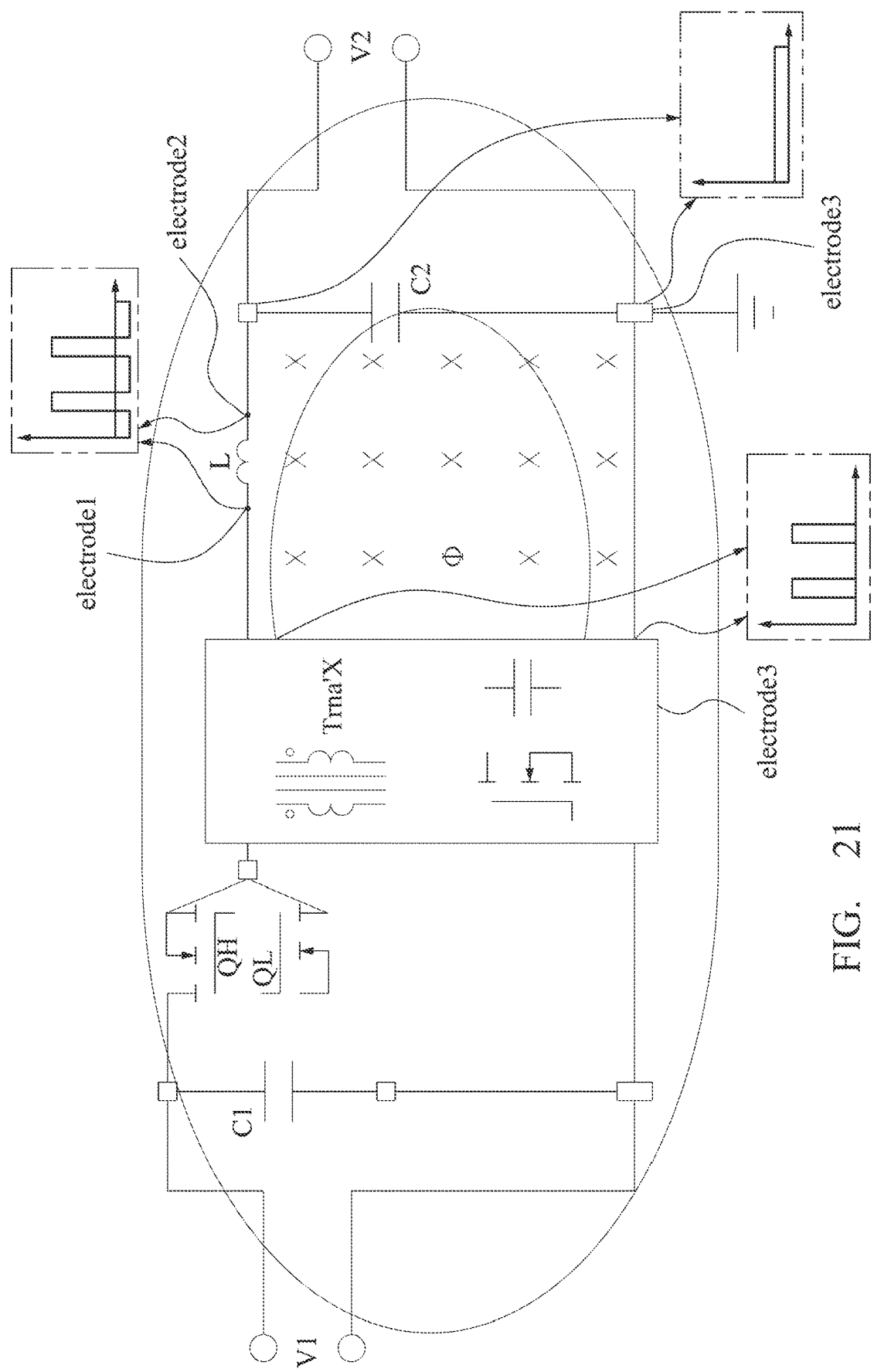
FIG. 21 is a schematic diagram of a power converting device which uses a transformer element according to embodiments of the present invention.
Figure 22A:
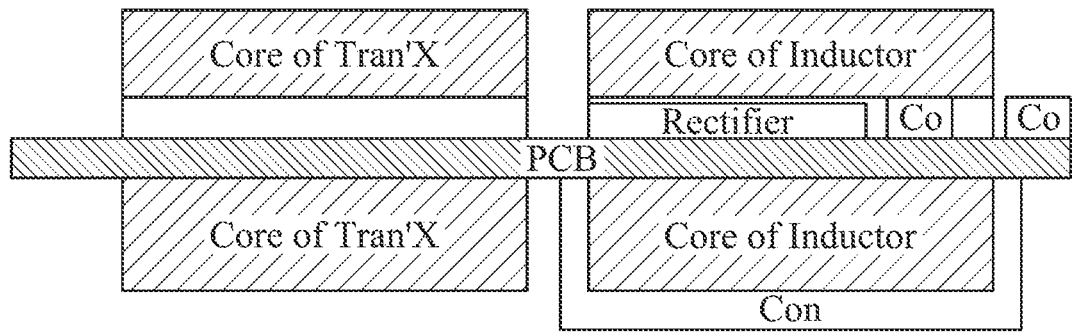
FIG. 22A is a schematic cross-sectional view of a power converting device which uses a transformer element according to embodiments of the present invention.
Figure 22B:
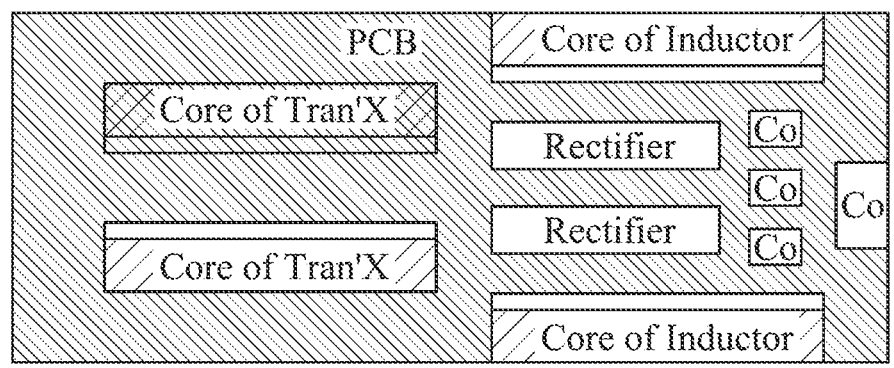
FIG. 22B is a schematic cross-sectional view of a power converting device which uses a transformer element according to embodiments of the present invention.
Figure 23:
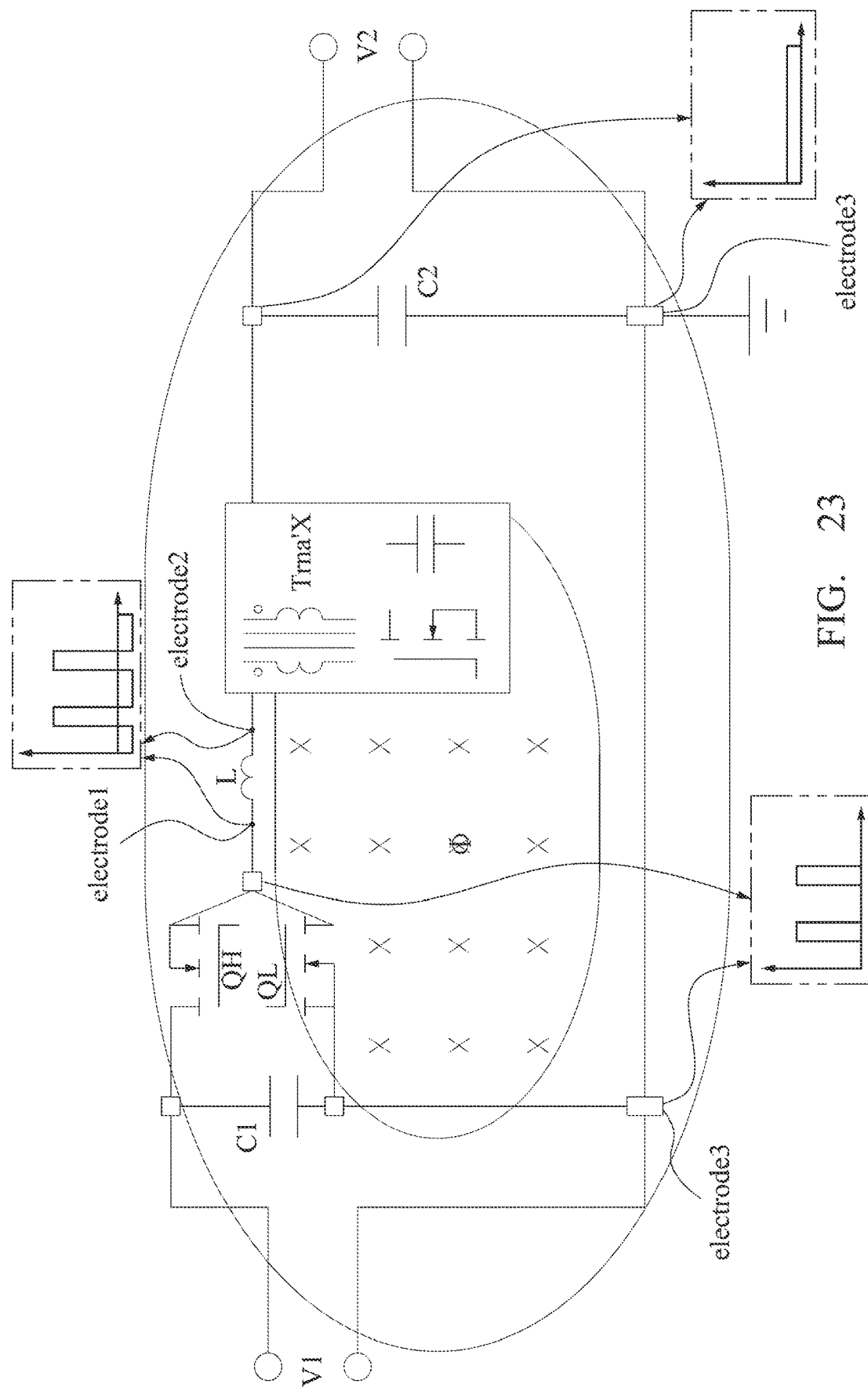
FIG. 23 is a schematic diagram of a power converting device which uses a transformer element according to embodiments of the present invention.

FIG. 21 is a schematic diagram of a power converting device which uses a transformer element according to embodiments of the present invention. FIG. 22A is a schematic cross-sectional view of a power converting device which uses a transformer element according to embodiments of the present invention. FIG. 22B is a schematic cross-sectional view of a power converting device which uses a transformer element according to embodiments of the present invention. FIG. 23 is a schematic diagram of a power converting device which uses a transformer element according to embodiments of the present invention. The core of the present invention describes as follow, the current loop and the magnetic-conductive assembly Core are used to realize inductance which the loop needs. The present invention doesn't need to use the conventional coil and magnetic core to realize inductance which the loop needs, so that the circuit design has many helpful opportunity to deform. Therefore, the present invention is suitable for any case of the current loop which needs inductance. It is well known, almost all power converting circuits can be equivalent to the buck converters and the Boost converters, and the buck converter and the Boost converter is only changing the definition of the input and the output actually. Therefore, the present invention may also use the series of the circuits as shown in FIGS. 21-23 to specify the actual circuit, however, the shown inductors are not conventional electronic components which specifically exist, but only an equivalent inductor module.

As shown in FIG. 21, when the label V1 is the input and the label V2 is the output, the power converting device is a buck converter. When label V2 is the input and the label V1 is the output, the power converting device is the Boost converter. The capacitor C1 and the bridge arm (QH+QL) constitute the first power element module; the capacitor C2 constitutes the second power element module. For convenient explanation, the buck converter is first used to explain. Therefore, the capacitor C1 is the input capacitor, and the capacitor C2 is the output capacitor. Such configuration may define that, the first power element module at least has the power semiconductor switch element which works at high frequency, which comprises the input capacitor C1 and the said power semiconductor unit, to reduce its voltage spike. The input capacitor C1 is the decoupling capacitor which is conventionally defined. At least one of the two electrodes of the first power element module need to be connected to the said AC current loop. The output capacitor C2 is then in the equivalent circuit, and connected to the said equivalent inductor. That is, its two electrodes are both connected to the said AC current loop. The output capacitor C2 is the filter capacitor or resonant capacitor which is conventionally defined, used to handle the energy in the said equivalent inductor.

As shown in FIGS. 21,22A and 22B, the transformer which is required for transforming and isolating may be added in the left side of the inductor, and the rest necessary components which match the transformer are also added, such as the rectifiers and the capacitors, so that the power converting device is deformed to conventional Pulse Width Modulation (PWM) circuit, such as the half-bridge circuit, the full-bridge circuit and the forward circuit, and these circuits need inductance in the output side of the transformer. Certainly, it is also suitable for some resonant circuits which need the secondary inductance. In these applications, it is better that the rectified power tube or the output capacitor Co of the output side of the transformer is disposed in the window of the magnetic-conductive assembly Core. Meanwhile, the most regions of the electrical conductor are disposed as the ground pins GND or the output pins Vo. Thus, the coil of the output side of the transformer, the rectified power tube, the output capacitor Co, the carrier board PCB, and the electrical conductor Con constitute the said current loop, and the current loop and the magnetic-conductive assembly Core together form the required inductance L. Therefore, it does not need the conventional coil to realize inductance L, the inductance L is no longer an independent inductance, and it only needs one magnetic-conductive assembly Core to be equivalent the aforementioned inductance. Such a design is more flexible, occupying smaller volume, and significantly reducing the losses in the realization. In present embodiment, not only the coil of the output side of the transformer, the rectified power tube, and the output capacitor Co may be seen as the said power element module, but also the whole transformer and the primary side active power device may be seen as one of the components of the power element module. Therefore, it may provide more possibility for the configuration way of the magnetic-conductive assembly Core.

As shown in FIG. 23, the transformer which is required for transforming and isolating may be added in the right side of the inductor, and the rest necessary components which match the transformer are added, such as the rectifiers and the capacitors. So the power converting device is deformed to conventional resonant circuit in FIG. 23. For example, the LLC circuit, that is the converter circuit which need the inductance in the input side of the transformer. Certainly, it is also suitable for some resonant circuits which need secondary inductance. In these applications, it is better that the power switch tube of the input side of the transformer, that is, the half-bridge constituted by the transistors QH and QL, is disposed in the window of the magnetic-conductive assembly Core. And the current loop intersects the magnetic loop to realize the resonant inductance which these kinds of the circuits need.

From the above detailed description of the present invention, it can be known that at least the following advantages can be obtained by applying the present invention. The circuits for realizing each kind of inductor function of the present invention are not limited to the specific circuits of the above embodiments, but the circuits may have wide applicability. Such as isolating, non-isolating circuit, DC/DC, AC/AC, and DC/AC, that is, all cases which need inductance. Comparing to the existing technology, the power device of the present invention may obtain the better electrical performance and the higher power density. The present invention may fully use the characteristics of the circuit and the magnetic material, and the present invention is easy to use. It is very favorable for promoting the power density and efficiency of the converter. Furthermore, the present invention provides the implementation method of the specific structures and applications, and the present invention has extreme feasibility. Therefore, the present invention is very suitable for promoting overall performance and price-performance ratio for manufacturing the power converter.

Although above DETAILED DESCRIPTION discloses the specific embodiment of present invention. However, it is not used to limit present invention. Those skilled in the art can make various changes and modifications of the present invention without departing from the principle and spirit of the invention. Therefore, the scope of present invention should refer to the following claims.

What is claimed is:

1. A power converting device, comprising a first current level, a second current level, a first magnetic layer, and a second magnetic layer, wherein the first current level and the second current level are used to load a current loop which has AC current component, the current loop comprises:
 a power element module, comprising:

at least two electrodes, wherein voltage among the at least two electrodes is AC voltage, wherein AC current magnitudes of the at least two electrodes are substantially equal and in the opposite direction; and a conductor coupled to the power element module;

wherein the first magnetic layer and the second magnetic layer are used to load a magnetic loop which comprises AC magnetic flux component;

wherein the first magnetic layer and the second magnetic layer are disposed along two opposite sides of the first current level;

wherein the first current level and the second current level are disposed along two opposite sides of the second magnetic layer.

2. The power converting device of claim 1, wherein the first current level, the second current level, the first magnetic layer, and the second magnetic layer are staggered with each other to form inductance which the current loop needs.

3. The power converting device of claim 1, wherein the power element module comprises:

at least one switch disposed in the first current level.

4. The power converting device of claim 3, wherein the power element module comprises a carrier board, wherein the at least one switch is disposed on the carrier board.

5. The power converting device of claim 4, wherein the power converting device further comprises:

a first magnetic-conductive portion disposed in the first magnetic layer; and a second magnetic-conductive portion disposed in the second magnetic layer;

wherein the conductor is disposed on an outer surface of the second magnetic-conductive portion, and coupled to the carrier board.

6. The power converting device of claim 1, wherein the power element module further comprises:

a carrier board comprising an upper surface and a lower surface; and a power semiconductor unit disposed on the upper surface or the lower surface of the carrier board.

7. The power converting device of claim 6, wherein the first magnetic layer comprises a first magnetic cell disposed on the upper surface of the carrier board, and the second magnetic layer comprises a second magnetic cell disposed on the lower surface of the carrier board;

wherein there is a chamber between the first magnetic cell and the second magnetic cell, the power element module is disposed in the chamber, and the conductor is disposed on an outer surface of the first magnetic cell or an outer surface of the second magnetic cell.

8. The power converting device of claim 7, wherein the chamber comprises a depth, and the power element module is disposed to enter into the chamber with at least ⅓ of the depth of the chamber.

9. The power converting device of claim 7, wherein the power element module comprises:

a first power element module; and a second power element module, wherein the first power element module and the second power element module are connected in series to simultaneously perform the power conversion for an input to generate an output, and at least one of the first power element module and the second power element module is disposed in the chamber.

* * * * *